(12) United States Patent
Jin et al.

(10) Patent No.: US 10,917,552 B2
(45) Date of Patent: Feb. 9, 2021

(54) PHOTOGRAPHING METHOD USING EXTERNAL ELECTRONIC DEVICE AND ELECTRONIC DEVICE SUPPORTING THE SAME

(71) Applicant: Samsung Electronics Co., Ltd., Suwon-si (KR)

(72) Inventors: In Ji Jin, Bucheon-si (KR); Hyuk Kang, Yongin-si (KR); Tae Ho Kim, Cheongju-si (KR); Tae Gun Park, Hwaseong-si (KR); Gyu Cheol Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/905,031

(22) Filed: Feb. 26, 2018

(65) Prior Publication Data

US 2018/0249062 A1 Aug. 30, 2018

(30) Foreign Application Priority Data

Feb. 28, 2017 (KR) ........................ 10-2017-0025953

(51) Int. Cl.
*H04N 5/232* (2006.01)
*H04N 5/272* (2006.01)
(Continued)

(52) U.S. Cl.
CPC ......... *H04N 5/23203* (2013.01); *G06F 3/011* (2013.01); *G06T 3/4038* (2013.01);
(Continued)

(58) Field of Classification Search
CPC ........... H04N 5/23203; H04N 5/23296; H04N 5/272; H04N 5/2354; H04N 5/23216; G06T 3/4038; G06T 11/60; G06F 3/011
See application file for complete search history.

(56) References Cited

U.S. PATENT DOCUMENTS 9,077,889 B2 7/2015 Hayashi
9,094,597 B2 7/2015 Yumiki et al.
(Continued)

FOREIGN PATENT DOCUMENTS

CN 102479251 A 5/2012
CN 104410780 A 3/2015
(Continued)

OTHER PUBLICATIONS

Chu et al. (English Translation of KR 10-2015-0114130 published on Feb. 22, 2017) (Year: 2017).*
(Continued)

*Primary Examiner* — Anner N Holder
*Assistant Examiner* — Jill D Sechser
(74) *Attorney, Agent, or Firm* — Jefferson IP Law, LLP

(57) ABSTRACT

A photographing method using an external electronic device and an electronic device supporting the same are provided. The electronic device includes a communication circuit, a memory configured to store contents including a first image in which a virtual reality is realized, and a processor electrically connected to the communication circuit and the memory. The processor is configured to identify a first external electronic device that is around the electronic device, determine whether the first external electronic device can photograph a subject by using the first external electronic device, transmit a command to the first external electronic device through the communication circuit in response to a determination result that the first external electronic device can photograph the subject by using the camera, receive a second image photographed based on the command from the first external electronic device, and generate a third image based on the first image and the second image.

18 Claims, 19 Drawing Sheets

(51) Int. Cl.
*G06T 11/60* (2006.01)
*G06F 3/01* (2006.01)
*G06T 3/40* (2006.01)
*H04N 5/235* (2006.01)

(52) U.S. Cl.
CPC ......... *G06T 11/60* (2013.01); *H04N 5/23296* (2013.01); *H04N 5/272* (2013.01); *H04N 5/2354* (2013.01); *H04N 5/23216* (2013.01)

(56) References Cited

U.S. PATENT DOCUMENTS

| | | |
|---|---|---|
| 9,317,956 B2 | 4/2016 | Lee et al. |
| 9,357,119 B2 | 5/2016 | Matsuda et al. |
| 9,948,847 B2 | 4/2018 | Yang |
| 2012/0135784 A1 | 5/2012 | Lee et al. |
| 2012/0307079 A1 | 12/2012 | Yumiki et al. |
| 2013/0050513 A1 | 2/2013 | Hayashi |
| 2013/0120372 A1 | 5/2013 | Lee et al. |
| 2014/0368671 A1* | 12/2014 | Watanabe .............. H04N 5/272 348/207.1 |
| 2015/0015741 A1* | 1/2015 | Kim .................. H04N 5/23293 348/239 |
| 2015/0029350 A1 | 1/2015 | Matsuda et al. |
| 2015/0296120 A1 | 10/2015 | Yumiki et al. |
| 2015/0381847 A1* | 12/2015 | Takamori ............... G03B 15/07 358/475 |
| 2016/0142703 A1* | 5/2016 | Park ....................... G09G 3/001 348/39 |
| 2016/0301866 A1* | 10/2016 | Kim ....................... G03B 15/07 358/475 |
| 2016/0337612 A1* | 11/2016 | Im ......................... G06T 19/006 |
| 2017/0293297 A1* | 10/2017 | Kim ......................... B64D 43/00 |
| 2017/0351929 A1* | 12/2017 | Kim ........................... G09G 5/10 |

FOREIGN PATENT DOCUMENTS

| | | |
|---|---|---|
| CN | 106157262 A | 11/2016 |
| CN | 106303289 A | 1/2017 |
| EP | 2 571 248 A2 | 3/2013 |
| EP | 3 079 346 A2 | 10/2016 |
| KR | 10-2013-0052769 A | 5/2013 |

OTHER PUBLICATIONS

Chinese Office Action with English translation dated Dec. 19, 2019; Chinese Appln. No. 201810164665.4.
Chinese Office Action with English translation dated Nov. 3, 2020; Chinese Appln. No. 201810164665.4.

* cited by examiner

PHOTOGRAPHING METHOD USING EXTERNAL ELECTRONIC DEVICE AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0025953, filed on Feb. 28, 2017, in the Korean Intellectual Property Office, the disclosure of which is incorporated by reference herein in its entirety.

TECHNICAL FIELD

The disclosure relates to a photographing method using an external electronic device and an electronic device supporting the same.

BACKGROUND

In recent years, the users who want to feel as if they experienced realities through virtual realities (VRs) have increased. The virtual reality refers to a specific environment or a situation that is similar to the reality but is not the reality and that is artificially made by using a computer or the like. The user may indirectly experience an environment or a situation that cannot be directly experienced, through contents which realize a virtual reality, for example, VR contents. As an example, the user may experience a virtual reality, by which the user feels as if the user traveled a specific site, through VR contents such as a virtual tour.

Meanwhile, the electronic devices that help experience VRs have been actively distributed. As an example, a head-mounted display (HMD) device mounted on the head of the user may be attached to a facial surface of the user to output VR contents so that the user may be helped to have spatial and temporal experiences that are similar to the reality.

The above information is presented as background information only to assist with an understanding of the disclosure. No determination has been made, and no assertion is made, as to whether any of the above might be applicable as prior art with regard to the disclosure.

SUMMARY

An electronic device according to the related art may not support capturing of a picture containing an actual subject, for example, capturing of a selfie containing the appearance of the user in the virtual reality provide by virtual reality (VR) contents.

Aspects of the disclosure are to address at least the above-mentioned problems and/or disadvantages and to provide at least the advantages described below. Accordingly, an aspect of the disclosure is to provide a method for supporting photographing in a virtual reality by using a camera included in an external electronic device existing around an electronic device, and an electronic device supporting the same.

In accordance with an aspect of the disclosure, an electronic device is provided. The electronic device includes a communication circuit, a memory configured to store contents including a first image in which a virtual reality is realized, and a processor electrically connected to the communication circuit and the memory. The processor is configured to identify a first external electronic device that is around the electronic device, determine whether it is possible for the first external electronic device to photograph a subject by using a camera of the first external electronic device, transmit a command to the first external electronic device through the communication circuit in response to a determination result that it is possible for the first external electronic device to photograph the subject by using the camera, receive a second image photographed based on the command from the first external electronic device through the communication circuit, and generate a third image based on the first image and the second image.

In accordance with another aspect of the disclosure, a photographing method using an external electronic device of an electronic device is provided. The photographing method includes outputting a first image included in contents that realize a virtual reality on a display, identifying a first external electronic device that is around the electronic device, determining whether it is possible for the first external electronic device to photograph a subject by using a camera of the first external electronic device, transmitting a command to the first external electronic device through a communication circuit in response to a determination result that it is possible for the first external electronic device to photograph the subject by using the camera, receiving a second image photographed based on the command from the first external electronic device through the communication circuit, and generating a third image based on the first image and the second image.

The disclosure may allow a user to feel as if the user captured a picture while actually traveling by supporting photographing (capturing of a selfie) in a virtual reality.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
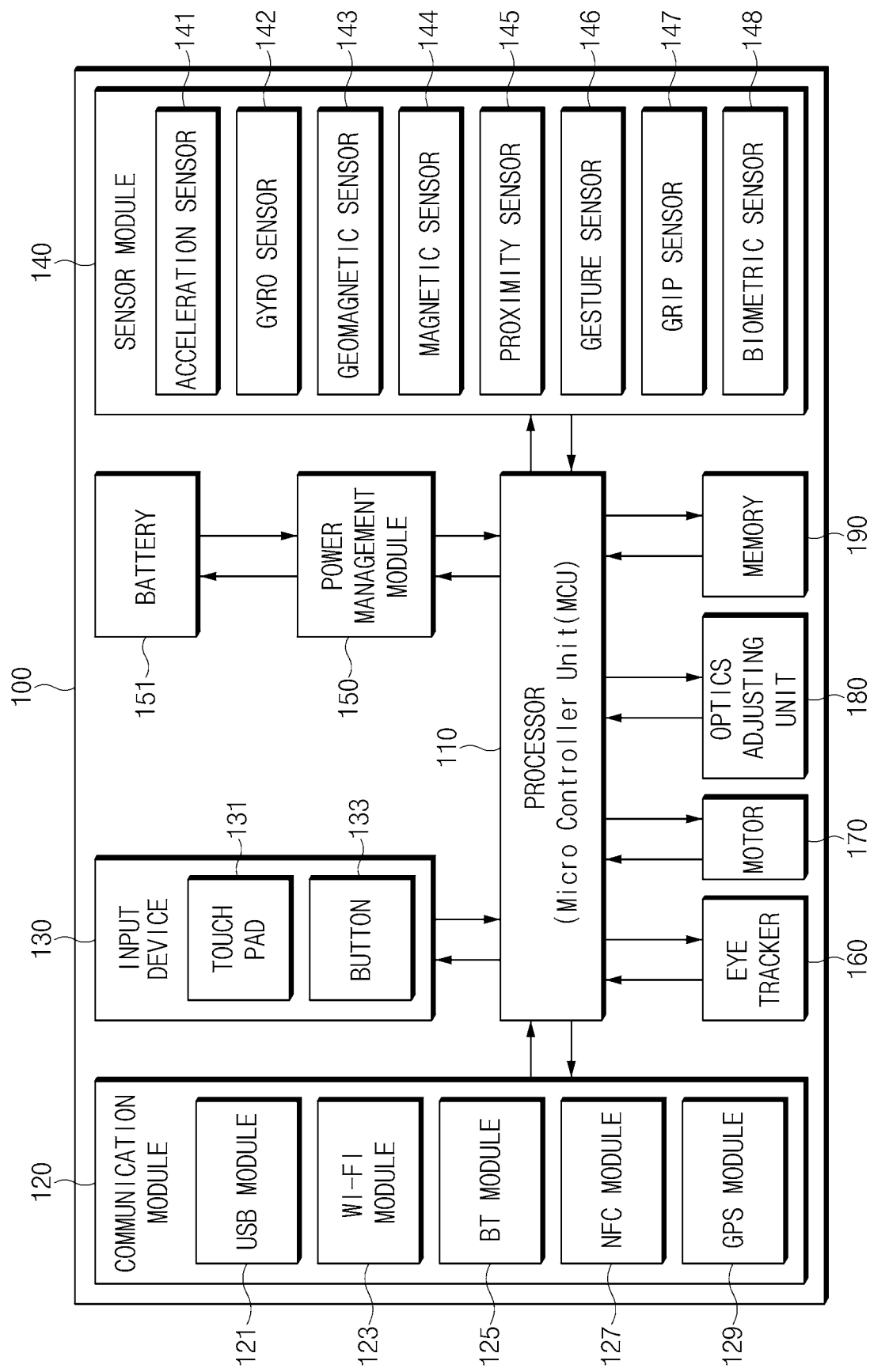
FIG. 1 is a block diagram of an electronic device that provides a virtual reality (VR) environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the disclosure, but are not intended to limit the elements. For instance, "a first user device" and "a second user device" may indicate different users regardless of order or importance. For example, a first component may be referred to as a second component and vice versa without departing from the scope and spirit of the disclosure.

In various embodiments of the disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general-purpose processor (for example, a central processing unit (CPU) or application processor (AP)) for performing corresponding operations by executing at least one software program stored in a memory device.

Terms used in various embodiments of the disclosure are used to describe certain embodiments of the disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the disclosure.

An electronic device according to various embodiments of the disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group phase 1 or phase 2 (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the disclosure may be a flexible device. An electronic device according to an embodiment of the disclosure is not limited to the above-mentioned devices, and may include new electronic devices with the development of new technology.

Hereinafter, an electronic device according to various embodiments of the disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram of an electronic device that provides a virtual reality (VR) environment according to an embodiment of the disclosure.

The electronic device 100 may allow the user to indirectly experience an environment or a situation which the user cannot directly experience, by executing VR contents that realize a virtual reality. Further, the electronic device 100 may support photographing in a virtual reality by using a camera installed in an external electronic device (e.g., a smartphone) existing around the electronic device 100. The electronic device 100, for example, may include a head-mounted display device (hereinafter, referred to as an HMD device) that may execute VR contents and may be connected to an external electronic device including a camera.

Referring to FIG. 1, the electronic device 100 may include a processor 110 (e.g., a micro controller unit (MCU)), a communication module 120 (or a communication circuit (e.g., a transceiver)), an input device 130, a sensor module 140, a power management module 150, a battery 151, an eye tracker 160, a motor 170, an adjustable optics unit or optics adjusting unit 180 (or a lens assembly), and a memory 190. However, the configuration of the electronic device 100 is not limited thereto. According to various embodiments, at least one of the elements of the electronic device 100 may be excluded or at least one other element may be further included. According to an embodiment, the electronic device 100 may further include a display, and may be provided with a frame in which an external display device (e.g., a smartphone) may be detachably seated.

The processor 110 may execute operations or data processing related to the control and/or communication of at least one other element of the electronic device 100. The processor 110, for example, may drive an operating system (OS) or an embedded software (S/W) program to control a plurality of hardware elements connected to the processor 110. The processor 110 may load instructions or data, received from at least one other component (e.g., a non-volatile memory), in a volatile memory to process the loaded instructions or data, and may store various types of data in a non-volatile memory. According to an embodiment, the processor 110 may load a command or data related to execution of VR contents stored in the memory 190 and photographing using an external electronic device in a volatile memory, and may process the command or data according to a specific program routine.

According to an embodiment, the processor 110 may execute VR contents stored in the memory 190. For example, the processor 110 may output a VR image included in the VR contents on a screen. According to an embodiment, the processor 110 may determine whether the user wears the electronic device 100 through a proximity sensor 145, and may execute VR contents automatically or through a user input when the user wears the electronic device 100. For example, the processor 110 may execute virtual tour contents that allow the user to travel virtually.

According to an embodiment, the processor 110 may search for an external electronic device around the electronic device 100 based on the communication module 120. As an example, the processor 110 may deliver a service discovery request to the external electronic device by using a service discovery protocol (SDP) based on the communication module 120. Further, the processor 110 may receive a response to the request from the external electronic device, and may determine a service capacity or a device capacity of the external electronic device based on the response. Through this, the processor 110 may determine external electronic devices including a camera from external electronic devices around the electronic device 100, and may determine an external electronic device that may photograph a picture from the external electronic devices including a camera.

According to an embodiment, the processor 110 may obtain a capture image from the external electronic device through the communication module 120. The capture image, for example, may include an image of a subject, for example, a user who wears the electronic device 100 through the camera included in the external electronic device.

According to an embodiment, the processor 110 may analyze the capture image, and may extract an object corresponding to the subject (e.g., the user) from the capture image. For example, the processor 110 may classify areas occupied by the objects constituting the image by using peripheries of the objects, and may extract only an object corresponding to the subject from the objects.

According to an embodiment, the processor 110 may classify the objects constituting the capture image. For example, the processor 110 may determine whether the corresponding object is a human being, an animal, or an object, and further classify the objects by determining a part (e.g., a face) of the human body, the kind of the animal, or the kind of the object. Further, the processor 110 may determine locations (e.g., coordinate information) at which the objects are disposed from the capture image.

According to an embodiment, the processor 110 may perform a pre-processing function of changing an image such that the image may be well recognized, for recognition of an object in advance, a recognition function of recognizing the object, and a post-processing function of increasing recognition accuracy of data processed through the recognition function. The pre-processing function may include schemes such as removal of noise, segmentation, normalization of size, edge detection, a color constancy algorithm, region growing, or borderline tracking. The recognition function may include schemes such as pattern matching, template matching, artificial intelligence, a neural network, a fuzzy algorithm, a decision tree, a genetic algorithm, PCA, SIFT, SURF, or deep learning. The post-processing function, for example, may include a scheme of suggesting a candidate to the user and receiving a selection when accuracy is a predetermined level or less based on data processed through the recognition function or a scheme of reducing groups of candidates based on another algorithm or a context.

Among the image analysis schemes, the scheme of dividing an image may include a scheme such as region growing, split-and-merge, or graph partitioning. The region growing and the split-and-merge are schemes of dividing an image into small areas, calculating color tones or brightness differences of adjacent areas, and merging similar areas, and may divide the image into finally left areas. Meanwhile, the two schemes are different in that the former is a scheme (a bottom-up scheme) of merging the areas, starting from a small area and the latter is a scheme (top-down scheme) of finding areas, starting from a large area. The above-mentioned two schemes obtain a division result in a relatively short time. In contrast, the graph partitioning is a scheme of designating pixels of an image as nodes and using a graph in which pixel difference values of adjacent pixels are connected by edges having weights. The graph partitioning may divide an image such that an energy function defining one graph in advance may become minimum. In this case, the graph partitioning may be divided into several schemes according to the kinds of the used energy functions. In the graph partitioning, an area that necessarily has to be included in an object or cannot be included in the object has to be designated, and the amount of calculations may be large according to the kinds of the energy functions or the sizes of images. However, in the graph partitioning, the division result is relatively good, and various forms of user inputs may be easily dealt with. In addition, various schemes for recognizing an object may be used. For example, a grab cut algorithm or a watershed algorithm may be used. The grab cut algorithm, for example, is based on partial labeling, and may be used when a panorama object and a background are divided over the whole image. The watershed algorithm is a method for analyzing height while regarding a set of pixels in an image as a 2-dimensional topography, and may be used when an object is divided in an environment having much noise based on a similarity of brightness between the pixels of the image.

According to an embodiment, the processor 110 may add an object corresponding to a subject extracted from the photographed image and may add the object to the VR image. For example, the processor 110 may merge (or incorporate or synthesize) the object corresponding to the subject into (with) the VR image. The merge scheme, for example, may include alpha blending or feathering. The alpha blending is a scheme of expressing a transmission image by adding an alpha value indicating transparency to image data corresponding to an image. The feathering is a scheme of gradually changing data values from one data value to another data value by mixing the data values in an area in which two data sets overlap each other. However, the merge scheme is not limited thereto. According to various embodiments, the merge scheme may further include pyramid blending, two-band blending, or gradient domain blending. Through the merge scheme, the processor 110 may generate an image (hereinafter, referred to as a virtual capture image) that is virtually captured and in which it looks as if a subject was present in a virtual reality that realizes VR contents.

According to an embodiment, the processor 110 may merge the VR image and the object by correcting the object when the VR image and the object are merged. For example, when the object corresponds to a user who wears the electronic device 100, it looks as if the user was not actually in a virtual environment (or a VR environment) when the user wears the electronic device 100. Accordingly, the processor 110 may correct a part of the object in which the electronic device 100 is mounted. As an example, the processor 110 may replace the electronic device 100 by another accessory (e.g., sunglasses) corresponding to the shape of the electronic device 100. Further, the processor 110 may correct the object based on the image of the user stored in the memory 190.

According to an embodiment, the processor 110 may change a field of view (FOV) of the VR image based on sensing data obtained through the sensor module 140. As an example, the processor 110 may determine a motion of the electronic device 100 based on the sensing data, and may change the FOV of the VR image based on a direction and a change of the motion.

According to an embodiment, the processor 110 may set a background of a virtual capture image based on the FOV of the VR image. As an example, the processor 110 may set an image output in a current screen area of the VR image as a background of the virtual capture image.

According to an embodiment, the processor 110 may change a structure of the background of the virtual capture image based on at least one of sensing data obtained through the sensor module 140 or sensing data received from the external electronic device connected through the communication module 120. As an example, the processor 110 may determine at least one of a motion of the electronic device 100 and a motion of the external electronic device including the camera based on the sensing data, and may change the structure of the background of the virtual capture image based on a direction and a change of the motion. In some embodiments, the processor 110 may change the structure of the background of the virtual capture image based on a user input received through the input device 130.

According to an embodiment, the processor 110 may change a photographing angle of a subject based on at least one of the sensing data obtained through the sensor module 140 or the sensing data received from the external electronic device connected through the communication module 120. As an example, the processor 110 may determine at least one of a motion of the electronic device 100 and a motion of the external electronic device including the camera based on the sensing data, and may change a photographing angle of the subject based on a direction and a change of the motion.

According to an embodiment, the processor 110 may output the image generated by merging the VR image and the object corresponding to the subject on the screen. As another example, the processor 110 may store the generated image in the memory 190. As another example, the processor 110 may transmit the generated image to an external electronic device (e.g., a content sharing server) through the communication module 120.

The communication module 120 may transmit and receive data by connecting the electronic device 100 and the external electronic device by using wired and/or wireless communication. According to an embodiment, the communication module 120 may include a universal serial bus (USB) module 121, a Wi-Fi module 123, a Bluetooth (BT) module 125, a near field communication (NFC) module 127, or a global positioning system (GPS) module 129. According to any embodiment, at least some (for example, two or more) of the Wi-Fi module 123, the BT module 125, the NFC module 127, or the GPS module 129 may be included in one incorporated chip (IC) or an IC package.

The input device 130 may include a touchpad 131 or a button 133. The touch panel 131, for example, may recognize a touch input in at least one of a capacitive scheme, a resistive scheme, an infrared ray scheme, and an acoustic wave scheme. Further, the touchpad 131 may further include a control circuit. A capacitive touchpad may recognize a physical contact or a proximity. The touchpad 131 may further include a tactile layer. In this case, the touchpad 131 may provide a user with a tactile reaction. The button 133 may include, for example, a physical button, an optical key, or a keypad.

The sensor module 140 may measure a physical quantity or sense an operating state of the electronic device 100, and may convert the measured or sensed information into an electric signal. The sensor module 140, for example, may include at least one of an acceleration sensor 141, a gyro sensor 142, a geomagnetic sensor 143, a magnetic sensor 144, a proximity sensor 145, a gesture sensor 146, a grip sensor 147, or a biometric sensor 148. According to an embodiment, a motion of the electronic device 100 may be detected by using at least one of the acceleration sensor 141, the gyro sensor 142, or the geomagnetic sensor 143, and a motion of the head of the user who wears the electronic device 100 may be detected based on the motion of the electronic device 100. According to an embodiment, it may be detected whether the electronic device 100 (e.g., a head-mounted display (HMD) device 100) is mounted, by using the proximity sensor 145 or the grip sensor 147. According to an embodiment, the sensor module 140 may further include an infrared (IR) sensor, a pressure sensor, or a touch sensor to detect whether the user wears the HMD device 100 by detecting at least one of recognition of an IR ray, recognition of a pressure, a change rate of capacitance (or permittivity).

The gesture sensor 146 may detect a motion of a hand or a finger of the user to receive the motion as an input operation of the electronic device 100. Additionally or alternatively, the sensor module 140, for example, may recognize biometric information of the user by using a biometric recognition sensor such as an E-nose sensor, an electromyography (EMG) sensor, an electroencephalogram (EEG) sensor, an electrocardiogram (ECG) sensor, an iris sensor, and/or a fingerprint sensor.

The sensor module 140 may further include a control circuit for controlling one or more sensors included therein. In some embodiments, the electronic device 100 may further include a processor configured to control the sensor module 140 as a part of or separately from the processor 110, and may control the sensor module 140 while the processor 110 is in a sleep state. According to an embodiment, at least some elements of the sensor module 140 may be included in the external electronic device that may be attached to or detached from the electronic device 100.

The power management module 150, for example, may manage power of the electronic device 100. According to an embodiment of the disclosure, the power management module 150 may include a power management integrated circuit (PMIC), a charger integrated circuit (IC), or a battery or fuel gauge. The PMIC may have a wired and/or wireless charging scheme. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 151, and a voltage, a current, or a temperature while charging. The battery 151 may include, for example, a rechargeable battery and/or a solar battery. In some embodiments, the power management module 150 may use a battery included in the external electronic device if the external electronic device is connected to the electronic device 100. Further, the power management module 150 may manage electric power that is supplied from an external power source.

The eye tracker 160, for example, may track an eye of the user by using at least one of an electrical oculography sensor (e.g., an electrooculography sensor), a coil system, a dual Purkinje system, a bright pupil system, or a dark pupil system. Further, the eye tracker 160 may further include a micro camera for tracking an eye.

The motor 170 may convert an electrical signal into mechanical vibration, and may generate a vibrational or haptic effect.

The optics adjusting unit 180 may measure an inter-pupil distance (IPD) of the user such that the user may watch an image suitable for his or her eye sight to adjust a distance of the lens and a location of the display of the external electronic device 100 that may be attached to or detached from the electronic device 100.

The memory 190 may include an internal memory or an external memory. The memory 190, for example, may store a command or data related to at least one other component of the electronic device 100. According to an embodiment, the memory 190 may store software and/or a program. For example, the memory 190 may store an application that may execute VR contents and the like. Further, the memory 190 may store VR contents, a capture image received from the external electronic device, or a virtual capture image.

According to various embodiments, the electronic device 100 may provide a see-though mode by using a rear camera of the external electronic device when the external electronic device including a display is mounted on the electronic device 100 to be operated. As an embodiment, in the method for providing a see-through mode, the rear camera of the external electronic device may be executed if a see-through mode switching button is pressed. Then, a preview screen of the rear camera may be displayed in an area of an existing VR screen in a picture-to-picture (PIP) form, and a VR screen may be switched to a background and a preview screen of the camera may be expanded to the entire screen to be shown. Through this, the user may identify a surrounding environment through an image if necessary while experiencing an external virtual environment. According to another embodiment, a separate camera module may be added to a stand-alone type electronic device 100, on which an external electronic device is not mounted, and a see-through mode may be provided by using the electrode device.

Figure 2:
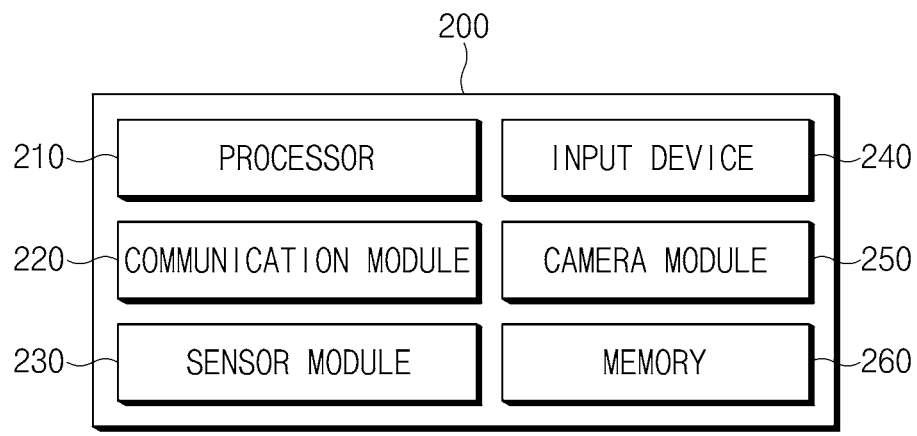
FIG. 2 is a block diagram of an electronic device including a camera according to an embodiment of the disclosure.

FIG. 2 is a block diagram of an electronic device including a camera according to an embodiment of the disclosure.

Referring to FIG. 2, an electronic device 200 that is adjacent to an external electronic device (e.g., the electronic device 100 of FIG. 1) and may provide a capture image for a subject to the external electronic device may include a processor 210 (e.g., at least one processor), a communication module 220 (e.g., a transceiver), a sensor module 230, an input device 240, a camera module 250, and a memory 260. However, the configuration of the electronic device 200 is not limited thereto. According to various embodiments, at least one of the elements of the electronic device 200 may be excluded or at least one other element may be further included.

The processor 210, for example, may execute operations or data processing related to the control and/or communication of at least one other component of the electronic device 200. The processor 210 may control a plurality of hardware or software components connected to the processor 210 by driving an operating system (OS) or an application program and perform a variety of data processing and calculations.

The processor 210 may include one or more of a central processing unit (CPU), an application processor (AP), or a communication processor (CP). Further, the processor 210 may further include a graphics processing unit (GPU) and/or an image signal processor (ISP). According to an embodiment, the processor 210 may be implemented by a system on chip (SoC).

According to an embodiment, the processor 210 may be electrically connected to a lens, an aperture, an image sensor, or a shutter included in the camera module 250 to control functions related to the camera module 250. The processor 210, for example, may control functions, such as automatic focusing, automatic exposure, custom white balance, zoom in, zoom out, photographing, continuous photographing, timer photographing, flash on/off, or filtering.

According to an embodiment, the processor 210 may store a capture image in an internal memory or a memory 260 included in the camera module 250. Further, the processor 210 may transmit the capture image to an external electronic device (e.g., the electronic device 100 of FIG. 1) through the communication module 220. In some embodiments, the electronic device 200 may further include a display, and the processor 210 may output a capture image on a display. For example, the processor 210 may provide the image stored in the internal memory as a preview or a live view. In some embodiments, the processor 210 may store an image captured by manipulating the shutter in the internal memory, and may store the image in the memory 260 when a specific user input is made through the input device 240 or according to set information.

According to an embodiment, the processor 210 may generate at least one command (or signal) that will be delivered to the external electronic device based on sensing data (e.g., motion information) obtained through the sensor module 230. Further, the processor 210 may deliver the command generated based on the image or sensing data captured through the camera module 250 to the external electronic device by using the communication module 220.

The communication module 220, for example, may set a communication between an electronic device 200 (for example, the electronic device 200) and an external electronic device. For example, the communication module 220 may be connected to a network through a wireless or wired communication to communicate with the external electronic device. For example, the communication module 220 may include a cell module, a BT module, or a Wi-Fi module.

The sensor module 230 may include an acceleration sensor, a gyro sensor, a proximity sensor, or a biometric sensor. The sensor module 230 may detect a motion of the electronic device 200 by using at least one of the acceleration sensor or the gyro sensor.

The input device 240 may include at least one function button. Further, the input device 240 may include a touch-pad, and may include a microphone that receives a voice input.

The camera module 250 may capture a still image or a video. According to an embodiment, the camera module 250 may include an imaging element. The imaging element, for example, may include at least one of a lens configured to receive image light of a subject to form an image, an aperture configured to adjust an amount of light passing through the lens, a shutter configured to open and close the aperture such that an image sensor may be exposed for a specific period of time by light passing through the lens, an image sensor configured to receive the image formed in the lens as an optical signal, and an internal memory. The internal memory may temporarily store the capture image. According to an embodiment, the internal memory may store the image captured by the image sensor before the shutter is manipulated.

The memory 260 may include a volatile and/or nonvolatile memory. The memory 260, for example, may store a command or data related to at least one other component of the electronic device 200. According to an embodiment, the memory 260 may store software and/or a program. For example, the memory 260 may store an application (e.g., a camera application) supporting a photographing function by using the camera module 250. As another example, the memory 260 may store an image captured by the camera module 250.

As described above, according to various embodiments, an electronic device (e.g., the electronic device 100) may include a communication circuit (e.g., the communication module 120), a memory (e.g., the memory 190) configured to store contents including a first image in which a virtual reality is realized, and a processor (e.g., the processor 110) electrically connected to the communication circuit and the memory. The processor may be configured to identify a first external electronic device (e.g., the electronic device 200) that is around the electronic device, determine whether it is possible for the first external electronic device to photograph a subject by using a camera (e.g., the camera module 250) of the first external electronic device, transmit a command to the first external electronic device through the communication circuit in response to a determination result that it is possible for the first external electronic device to photograph the subject by using the camera, receive a second image photographed based on the command from the first external electronic device through the communication circuit, and generate a third image based on the first image and the second image.

According to various embodiments, the processor may be further configured to output at least one of the first image, the second image, and the third image on a display included in the electronic device or a display device detachably connected the electronic device.

According to various embodiments, the second image may include an image obtained by photographing a user of the electronic device.

According to various embodiments, the processor may be configured to extract an object corresponding to the subject included in the second image, and merge at least a part of the first image and the object to generate the third image.

According to various embodiments, the processor may be further configured to correct a partial area of the object.

According to various embodiments, the processor may be configured to select at least a part of the first image based on at least one of first sensing data obtained through a first sensor module included in the electronic device, second sensing data obtained through a second sensor module included in the first external electronic device, and a user input, and use the selected at least a part of the first image when the third image is generated.

According to various embodiments, the processor may be further configured to change a photographing angle of the subject of the second image based on at least one of first sensing data obtained through a first sensor module included in the electronic device and second sensing data obtained through a second sensor module included in the first external electronic device.

According to various embodiments, the processor may be configured to obtain surrounding environment information of at least one of the electronic device and the first external electronic device, determine whether an external light source for photographing is necessary, based on the obtained surrounding environment information, determine whether there exists a second external electronic device that is able to be utilized as the external light source, and control the second external electronic device in response to the determination result that there exists the second external electronic device.

According to various embodiments, the processor may be configured to provide an interface such that the first external electronic device or a second external electronic device that is around the electronic device and is able to photograph the subject is selected, in response to the determination result that there exists the second external electronic device, and receive the second image from the selected external electronic device in response to selection of the first external electronic device or the second external electronic device.

According to various embodiments, the processor may be configured to receive the contents or the first image from a second external electronic device connected to the electronic device through the communication circuit.

Figure 3:
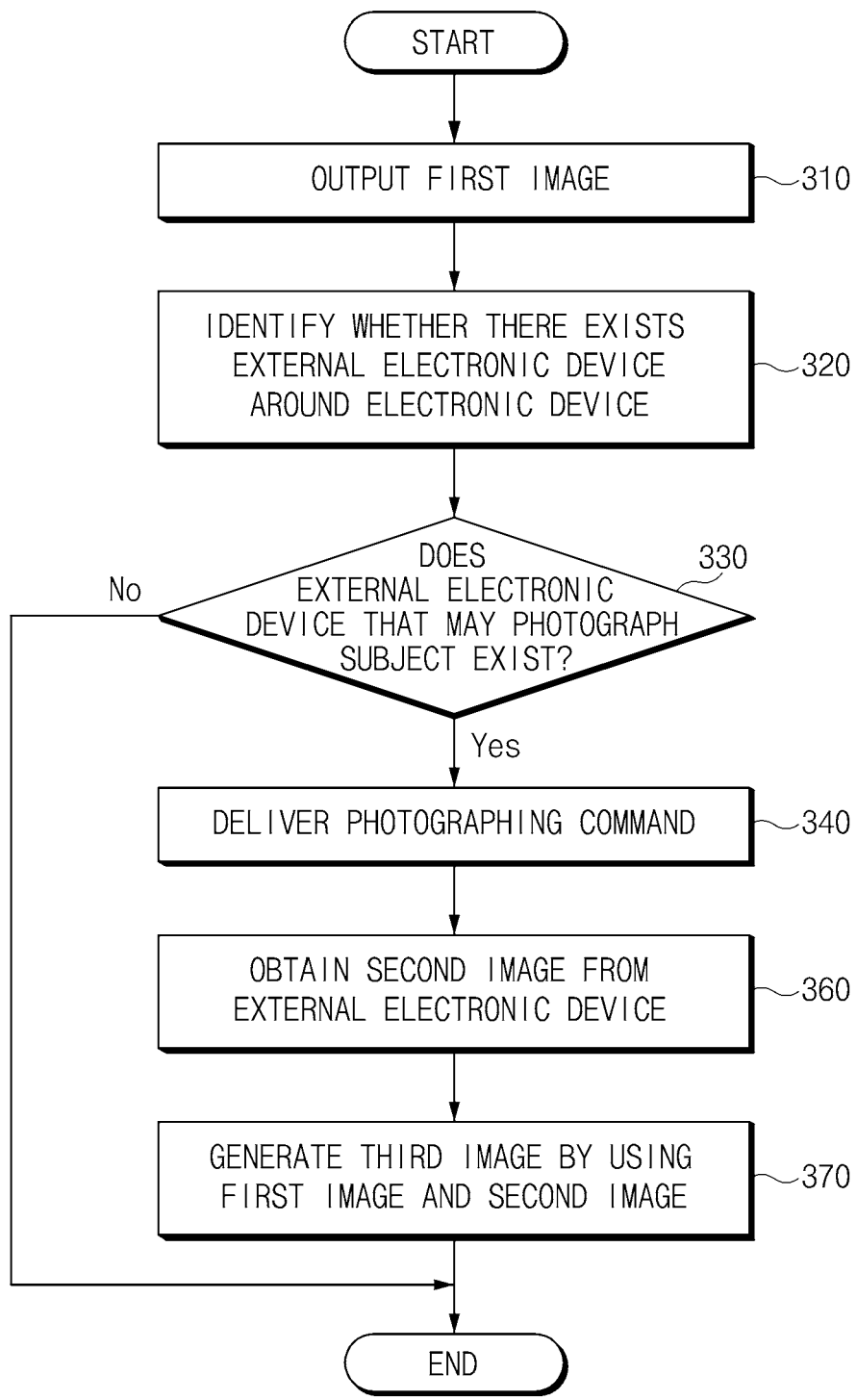
FIG. 3 is a view illustrating a method for managing an electronic device related to a photographing method using an electronic device according to an embodiment of the disclosure.

FIG. 3 is a view illustrating a method for managing an electronic device related to a photographing method using an electronic device according to an embodiment of the disclosure.

Referring to FIG. 3, in operation 310, the electronic device (e.g., the electronic device 100) may output a first image. For example, the processor 110 may output the first image through a display included in the electronic device or an external display device. The first image may be a VR image included in the VR contents.

In operation 320, the electronic device (e.g., the processor 110) may identify (or discover) an external electronic device (e.g., the electronic device 200) around the electronic device. According to an embodiment, the processor 110 may deliver a service discovery request to the external electronic device by using a service discovery protocol (SDP) based on the communication module 120, and may receive a response to the service discovery request from the external electronic device.

In operation 330, the electronic device (e.g., the processor 110) may determine whether there exists an external electronic device that may photograph a subject. As an example, the processor 110 may determine a service capacity or a device capacity of the external electronic device based on a response to the service discovery request. Through this, the processor 110 may determine external electronic devices including a camera (e.g., the camera module 250) from external electronic devices around the electronic device 100, and may determine an external electronic device that may photograph a picture from the external electronic devices including a camera.

When there exists an external electronic device that may photograph a subject, the electronic device (e.g., the processor 110) may provide an interface for photographing. According to an embodiment, the processor 110 may display a display object (e.g., an image or an icon) that informs existence of an external electronic device that may photograph the subject through the display (or an external display device) in a partial area (e.g., a right upper end area) of the first image. When there exists a plurality of external electronic devices that may photograph the subject, the processor 110 may generate icons corresponding to the external electronic devices, and may display the icons in a partial area of the first image. Further, the processor 110 may display the display objects that inform existence of the external electronic devices in a partial area of the first image, and if a user input for selecting the display objects is generated, may display the display objects corresponding to identification information of the external electronic devices in a partial area of the first image. In this case, the processor 110 may bind the icons or the display objects into groups according to the characteristics of the external electronic devices. In some embodiments, the processor 110 may output a voice that informs existence of the external electronic device that may photograph an object through a voice output device (e.g., a speaker).

According to various embodiments, when there exists a plurality of external electronic devices that may photograph the subject, the processor 110 may provide images (e.g., preview images) captured through cameras included in the external electronic devices through the display (or an external display device) in advance. Through this, the user may identify the preview image and may select an external electronic device having an optimum photographing structure.

According to an embodiment, the electronic device (e.g., the processor 110) may determine whether a user input is obtained through the interface. As an example, the processor 110 may determine whether a display object that informs existence of the external electronic device or a user input for selecting icons corresponding to the external electronic devices is obtained.

In operation 340, the electronic device (e.g., the processor 110) may deliver a photographing command to the external electronic device(s) through a communication module (e.g., the communication module 120). As an example, when the user input is obtained, the electronic device (e.g., the processor 110) may deliver the photographing command to the selected external electronic device.

In operation 360, the electronic device (e.g., the processor 110) may obtain a second image from the external electronic device(s). The second image may be an image that is obtained by photographing the subject (e.g., a user wearing the electronic device) through a camera included in the external electronic device(s).

In operation 370, the electronic device (e.g., the processor 110) may generate a third image by using the first image and the second image. The third image may be an image that is obtained by merging the first image and the second image. For example, the third image may be a virtual capture image for the subject in a background of which is a VR image.

According to an embodiment, the processor 110 may extract only an object corresponding to the subject from the second image, and may merge the extracted object into the first image. According to another embodiment, the processor 110 may merge the first image and the extracted object by correcting the object when the first image and the object are merged. For example, when the subject is a user who wears an electronic device (e.g., a head-mounted display (HMD) device), the processor 110 may correct a part of the object, on which the electronic device is mounted.

According to an embodiment, the processor 110 may output the third image on a screen. As another example, the electronic device may store the third image in a memory (e.g., the memory 190). As another example, the processor 110 may transmit the third image to an external electronic device (e.g., a content sharing server) through a communication module (e.g., the communication module 120).

Figure 4:
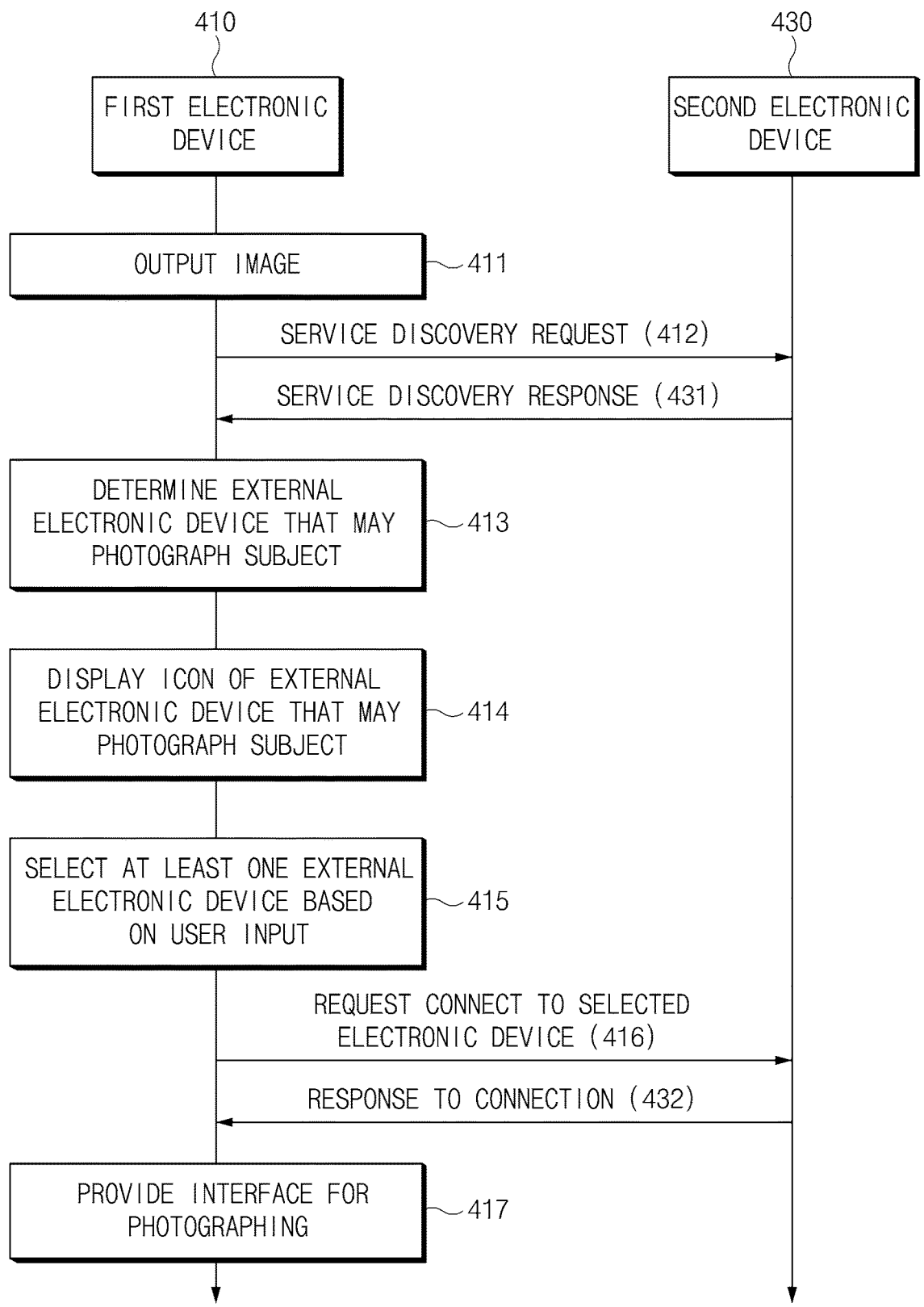
FIG. 4 is a view illustrating a method for providing a user interface for photographing using an external electronic device according to an embodiment of the disclosure.

FIG. 4 is a view illustrating a method for providing a user interface for photographing using an external electronic device according to an embodiment of the disclosure.

Referring to FIG. 4, in operation 411, an electronic device 410 (e.g., the electronic device 100) may output an image. As an example, the first electronic device 410 (e.g., the processor 110) may output a VR image included in VR contents on a display.

In operation 412, the first electronic device 410 (e.g., the processor 110) may deliver a service discovery request to a second electronic device 430 (e.g., the electronic device 200) through a communication module (e.g., the communication module 120). The service discovery request may be a kind of message (or signal) generated based on a service discovery protocol (SDP).

In operation 431, the second electronic device 430 (e.g., the processor 210) that received the service discovery request may deliver a response (service discovery response) to the first electronic device 410 through a communication module (e.g., the communication module 220). The service discovery response also is a kind of message (or signal) generated based on the SDP, and may include information, such as a service capacity or a device capacity of the second electronic device 430.

In operation 413, the first electronic device 410 (e.g., the processor 110) that received the service discovery response may determine there is an external electronic device that may photograph a subject, among the external electronic devices (e.g., the second electronic device 430) around the first electronic device 410. For example, the first electronic device 410 (e.g., the processor 110) may determine whether the second electronic device 430 includes a camera (e.g., the camera module 250) or may photograph a subject, based on the service discovery response.

When there exists an external electronic device that may photograph the subject, in operation 414, the first electronic device 410 (e.g., the processor 110) may display an icon of an external electronic device (e.g., the second electronic device 430) that may photograph the subject. As an example, the first electronic device 410 (e.g., the processor 110) may display the icon in a partial area of a VR image. In some embodiments, the first electronic device 410 (e.g., the processor 110) may display a display object that informs that there exists an external electronic device that may photograph the subject in a partial area of the VR image.

If a user input for selecting the icon (or display object) is generated, in operation 415, the first electronic device 410 (e.g., the processor 110) may select at least one external electronic device (e.g., the second electronic device 430) based on the user input. In some embodiments, if there exists a plurality of external electronic devices that may photograph the subject and a user input for selecting at least one of icons corresponding to the plurality of external electronic devices is generated, the first electronic device 410 (e.g., the processor 110) may select all of the external electronic devices corresponding to the selected icons.

In operation 416, the first electronic device 410 (e.g., the processor 110) may make a request for connection to the selected at least one external electronic device (e.g., the second electronic device 430). In operation 432, the at least one external electronic device (e.g., the second electronic device 430) that received the request for connection may transmit a response to the request for connection to the first electronic device 410.

In operation 417, the first electronic device 410 (e.g., the processor 110) that received the response may provide an interface for photographing. As an example, the first electronic device 410 (e.g., the processor 110) may display a photographing button realized in a software scheme in a partial area of the VR image. In some embodiments, the first electronic device 410 (e.g., the processor 110) may replace the photographing button by an icon of the external electronic device (e.g., the second electronic device 430) or a display object that informs that there exists an external electronic device that may photograph the subject.

Figure 5:
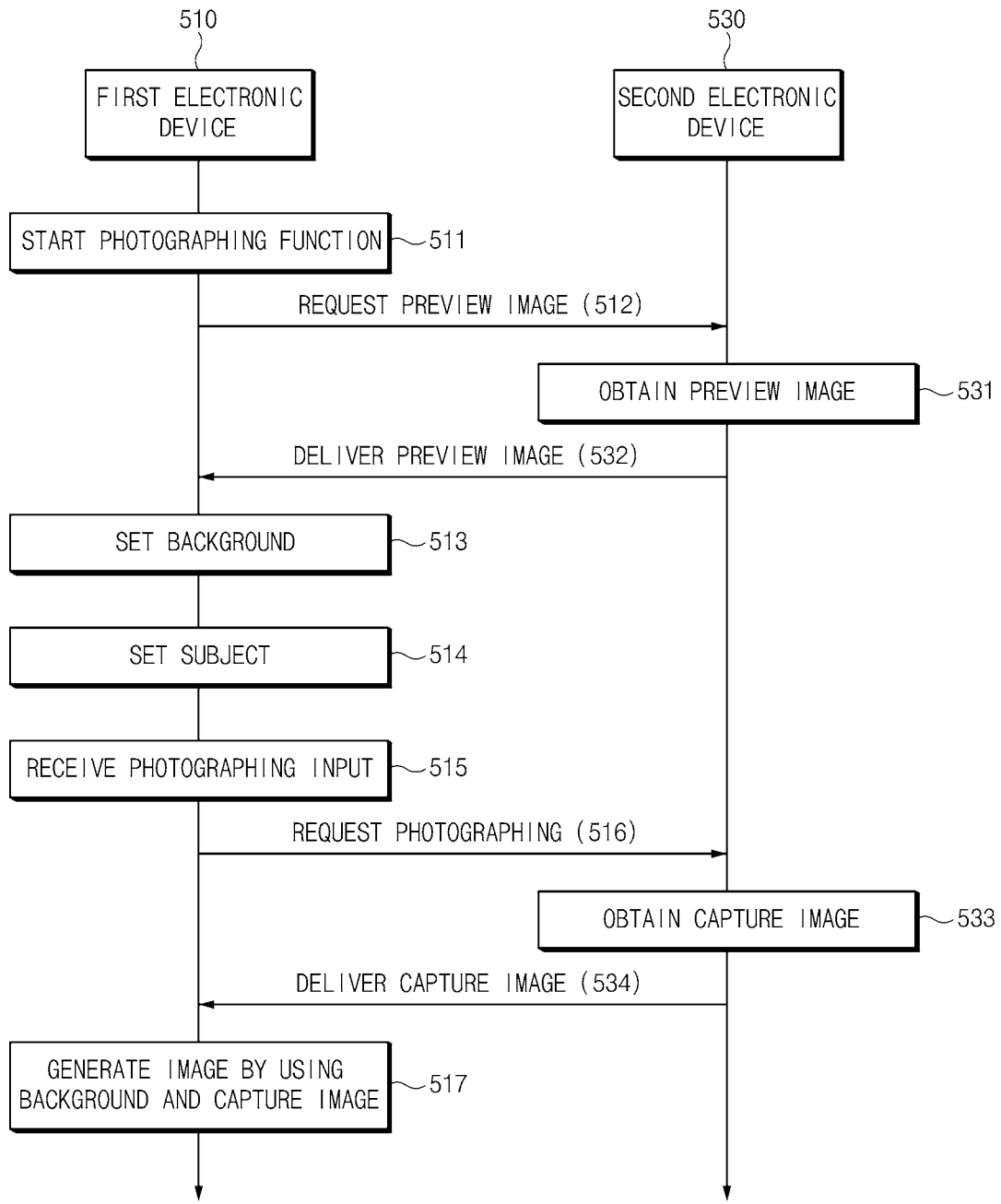
FIG. 5 is a view illustrating an image processing method for photographing in a VR environment according to an embodiment of the disclosure.

FIG. 5 is a view illustrating an image processing method for photographing in a VR environment according to an embodiment of the disclosure.

Referring to FIG. 5, in operation 511, a first electronic device 510 (e.g., the electronic device 100) may start a photographing function. For example, the first electronic device 510 (e.g., the processor 110) may start a photographing function through a series of operations described with reference to FIG. 4. The photographing function, for example, may be a virtual photographing function for a subject, a background of which is a VR image. By using the virtual photographing function, the first electronic device 510 (e.g., the processor 110) may obtain a virtual photographing image by which the user of the first electronic device 510 feels as if the user was present in the virtual environment.

In operation 512, the first electronic device 510 (e.g., the processor 110) may request a preview image from an external electronic device that may photograph a subject, for example, a second electronic device 530 (e.g., the electronic device 200). The preview image, for example, may be a preparation image for photographing the user of the first electronic device 510.

If receiving a request for a preview image, in operation 531, the second electronic device 530 (e.g., the processor 210) may obtain a preview image through a camera (e.g., the camera module 250). Further, in operation 532, the second electronic device 530 (e.g., the processor 210) may deliver the obtained preview image to the first electronic device 510. The preview image may be transmitted and received based on communication modules (e.g., the communication modules 120 and 220) included in the first electronic device 510 and the second electronic device 530.

In operation 513, the first electronic device 510 (e.g., the processor 110) that received the preview image may set a background for a virtual capture image. As an example, the first electronic device 510 (e.g., the processor 110) may set at least a part of the VR image output on the display, which is output in a current screen area, as a background of a virtual capture image. In some embodiments, the first electronic device 510 (e.g., the processor 110) may set the image output in the selected at least a partial area as the background of the virtual capture image, based on a user input for selecting at least a part of the screen area.

According to an embodiment, the first electronic device 510 (e.g., the processor 110) may change a field of view (FOV) of the VR image based on sensing data obtained through a sensor module (e.g., the sensor module 140) included in the first electronic device 510. As an example, the first electronic device 510 (e.g., the processor 110) may determine a motion of the first electronic device 510 based on the sensing data, and may change the FOV of the VR image based on a direction and a change of the motion.

According to an embodiment, the first electronic device 510 (e.g., the processor 110) may not change a background that was set once even though the FOV of the VR image is changed. According to another embodiment, the first electronic device 510 (e.g., the processor 110) may change (or reset) the background such that the background corresponds to a changed FOV if the FOV of the VR image is changed. In some embodiments, the first electronic device 510 (e.g., the processor 110) may change the structure of the background based on the sensing data received from the second electronic device 530. As an example, the first electronic device 510 (e.g., the processor 110) may determine a motion of the second electronic device 530 based on the sensing data received from the second electronic device 530, and may change the structure of the background based on a direction and a change of the motion. According to another embodiment, the first electronic device 510 (e.g., the processor 110) may change the structure of the background based on a user input. For example, if a user input (e.g., a flick, a swipe, or a drag) for moving a screen is generated, the first electronic device 510 (e.g., the processor 110) may change the structure of the background based on the direction and the movement of the user input.

In operation 514, the first electronic device 510 (e.g., the processor 110) may set a subject for the virtual capture image. According to an embodiment, the first electronic device 510 (e.g., the processor 110) may extract a specific object from the preview image received from the second electronic device 530, and may set the extracted object as an object corresponding to the subject. As an example, the first electronic device 510 (e.g., the processor 110) may set the user of the first electronic device 510 as a subject. In this case, the first electronic device 510 (e.g., the processor 110) may extract an object corresponding to the user of the first electronic device 510 from the preview image.

According to an embodiment, the first electronic device 510 (e.g., the processor 110) may change a photographing angle of the subject based on at least one of sensing data obtained through a sensor module (e.g., the sensor module 140) or sensing data received from the second electronic device 530. For example, the first electronic device 510 (e.g., the processor 110) may determine a motion of the first electronic device 510 based on the sensing data obtained through the sensor module, and may determine a motion of the second electronic device 530 based on the sensing data received from the second electronic device 530. Further, the first electronic device 510 (e.g., the processor 110) may change the photographing angle of the subject based on a direction and a change of the motion of the first electronic device 510 and a direction and a change of the motion of the second electronic device 530.

In operation 515, the first electronic device 510 (e.g., the processor 110) may receive a photographing input. As an example, the first electronic device 510 (e.g., the processor 110) may receive a user input for selecting a photographing button output in the VR image through an input device (e.g., the input device 130).

If the photographing input is received, in operation 516, the first electronic device 510 (e.g., the processor 110) may request photographing from the second electronic device 530. As an example, the first electronic device 510 (e.g., the processor 110) may transmit a signal corresponding to the request for photographing to the second electronic device 530 through a communication module (e.g., the communication module 120) to the second electronic device.

If receiving the request for photographing, in operation 533, the second electronic device 530 (e.g., the processor 210) may obtain a capture image by photographing a subject (e.g., the user of the first electronic device 510) by using a camera (e.g., the camera module 250). Further, in operation 534, the second electronic device 530 (e.g., the processor 210) may deliver the obtained capture image to the first electronic device 510 through a communication module (e.g., the communication module 220).

If receiving the capture image, in operation 517, the first electronic device 510 (e.g., the processor 110) may generate a virtual capture image by using the background and the capture image. According to an embodiment, the first electronic device 510 (e.g., the processor 110) may generate the virtual capture image by merging a part of the capture image into the background. In some embodiments, the first electronic device 510 (e.g., the processor 110) may extract only an object corresponding to a subject (e.g., the user of the first electronic device 510) from the capture image, and may merge the extracted object into the background.

According to an embodiment, the first electronic device 510 (e.g., the processor 110) may perform operation 513 before the performance of operation 512. Further, the first electronic device 510 (e.g., the processor 110) may output an object corresponding to the extracted subject in the background through performance of operation 514.

Figure 6:
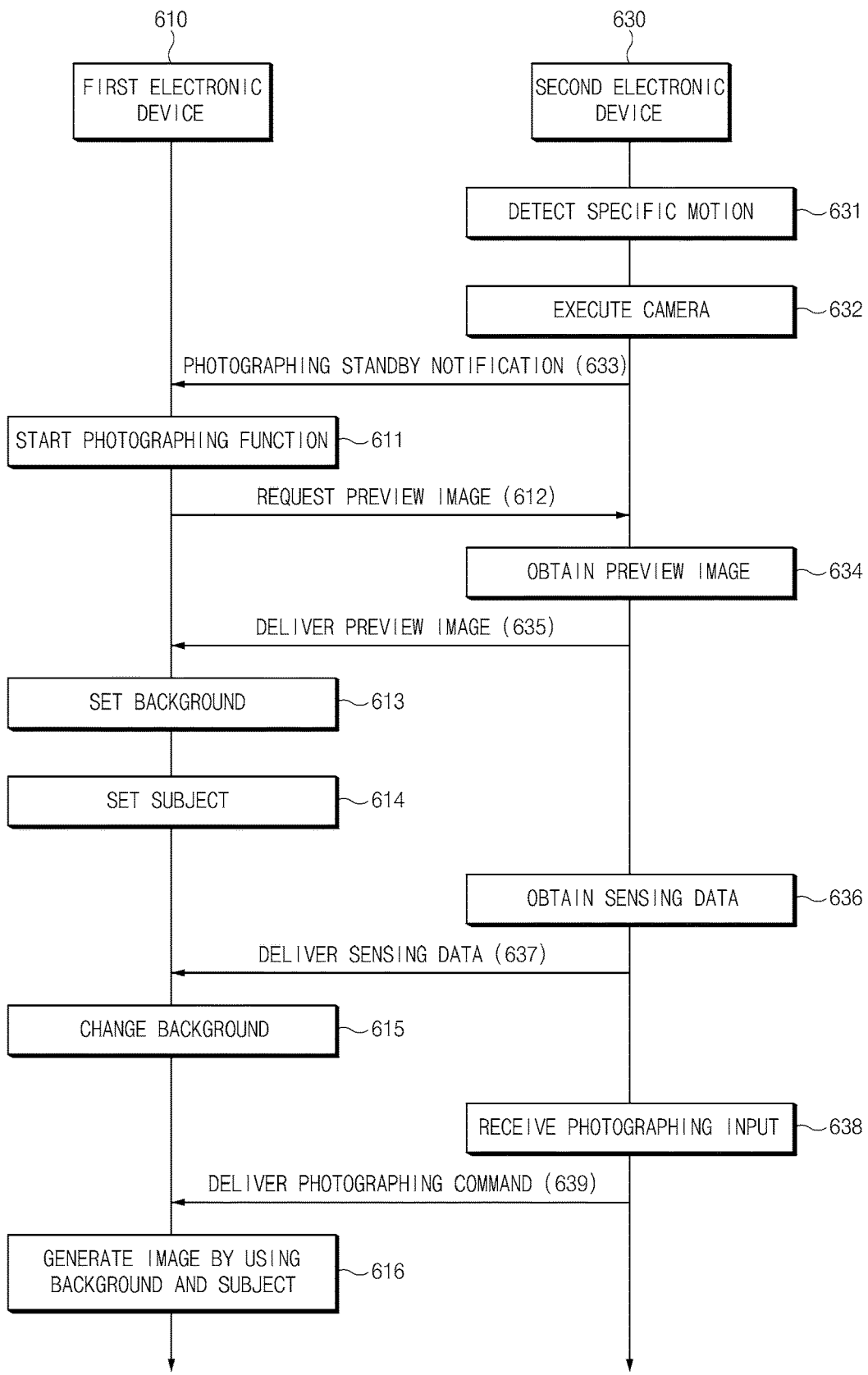
FIG. 6 is a view illustrating another image processing method for photographing in a VR environment according to an embodiment of the disclosure.

FIG. 6 is a view illustrating another image processing method for photographing in a VR environment according to an embodiment of the disclosure.

Referring to FIG. 6, in operation 631, a second electronic device 630 (e.g., the electronic device 200) may detect a specific motion. The specific motion, for example, may include a motion of the user (e.g., the user of the first electronic device 610) of the second electronic device 630 lifting the second electronic device 630 including a camera (e.g., the camera module 250) for capturing of a selfie. According to an embodiment, the second electronic device 630 (e.g., the processor 210) may determine a motion of the second electronic device 630 based on sensing data obtained through a sensor module (e.g., the sensor module 230), and may analyze a pattern of the motion to detect the specific motion. In some embodiments, the second electronic device 630 (e.g., the processor 210) may determine whether a user input, such as a button input, is generated instead of or while detecting the specific motion.

If the specific motion is detected (and/or the user input is generated), in operation 632, the second electronic device 630 (e.g., the processor 210) may execute a camera (e.g., the camera module 250). According to an embodiment, when a plurality of cameras is included in the second electronic device 630, the second electronic device 630 (e.g., the processor 210) may activate a camera that detects a subject (e.g., the user who wears the first electronic device 610) and deactivate another camera. Further, in operation 633, the second electronic device 630 (e.g., the processor 210) may deliver a photographing standby notification to the first electronic device 610 (e.g., the electronic device 100) through a communication module (e.g., the communication module 220). For example, the second electronic device 630 (e.g., the processor 210) may inform the first electronic device 610 that it is possible to photograph a subject. As an example, the second electronic device 630 (e.g., the processor 210) may transmit a command (or a signal) related to start of a photographing function to the first electronic device 610 through a communication module (e.g., the communication module 220).

If receiving the photographing standby notification, in operation 611, the first electronic device 610 (e.g., the processor 110) may start a photographing function. For example, the first electronic device 610 (e.g., the processor 110) may start a photographing function through a series of operations described with reference to FIG. 4.

In operation 612, the first electronic device 610 (e.g., the processor 110) may request a preview image from the second electronic device 630. The preview image, for example, may be a preparation image for photographing the user of the first electronic device 610.

If receiving a request for a preview image, in operation 634, the second electronic device 630 (e.g., the processor 210) may obtain a preview image through a camera (e.g., the camera module 250). Further, in operation 635, the second electronic device 630 (e.g., the processor 210) may deliver the obtained preview image to the first electronic device 610 through a communication module (e.g., the communication module 220).

In operation 613, the first electronic device 610 (e.g., the processor 110) that received the preview image may set a background for a virtual capture image. As an example, the first electronic device 610 (e.g., the processor 110) may set at least a part of the VR image output on the display, which is output in a current screen area, as a background of a virtual capture image. In some embodiments, the first electronic device 610 (e.g., the processor 110) may set the image output in the selected at least a partial area as the background of the virtual capture image, based on a user input for selecting at least a part of the screen area.

In operation 614, the first electronic device 610 (e.g., the processor 110) may set a subject for the virtual capture image. According to an embodiment, the first electronic device 610 (e.g., the processor 110) may extract a specific object from the preview image received from the second electronic device 630, and may set the extracted object as an object corresponding to the subject. As an example, the first electronic device 610 (e.g., the processor 110) may set the user of the first electronic device 610 as a subject. In this case, the first electronic device 610 (e.g., the processor 110) may extract an object corresponding to the user of the first electronic device 610 from the preview image.

In operation 636, the second electronic device 630 (e.g., the processor 210) may obtain sensing data through a sensor module (e.g., the sensor module 230). As an example, the second electronic device 630 (e.g., the processor 210) may obtain sensing data for a motion of the second electronic device 630. Further, in operation 637, the second electronic device 630 (e.g., the processor 210) may deliver the obtained sensing data to the first electronic device 610.

If receiving the sensing data, in operation 615, the first electronic device 610 (e.g., the processor 110) may change a background for the virtual capture image based on the sensing data. As an example, the first electronic device 610 (e.g., the processor 110) may determine a motion of the second electronic device 630 by analyzing the sensing data, and may change the structure of the background based on a direction and a change of the motion. In some embodiments, the first electronic device 610 (e.g., the processor 110) may change a photographing angle of the subject based on the sending data.

In operation 638, the second electronic device 630 (e.g., the processor 210) may receive a photographing input. As an example, the second electronic device 630 (e.g., the processor 210) may receive a user input for selecting a photographing button (e.g., a shutter) included in the second electronic device 630. In this case, the second electronic device 630 (e.g., the processor 210) may generate a photographing command (or a signal) corresponding to the photographing input. Further, in operation 639, the second electronic device 630 (e.g., the processor 210) may deliver the generated photographing command to the first electronic device 610.

If receiving the photographing command, in operation 616, the first electronic device 610 (e.g., the processor 110) may generate a virtual capture image by using the background and the subject. According to an embodiment, the first electronic device 610 (e.g., the processor 110) may generate the virtual capture image by merging an object corresponding to the subject into the background.

Through the above-mentioned operations, when it is difficult for the user to select a screen on which a VR image is output as in a head-mounted display (HMD) device (e.g., the first electronic device 610), an input related to photographing may be received through an electronic device (e.g., the second electronic device 630) including a camera. Further, if a user input is received through an electronic device including a camera, the user may feel as if the user actually captured a selfie.

Figure 7:
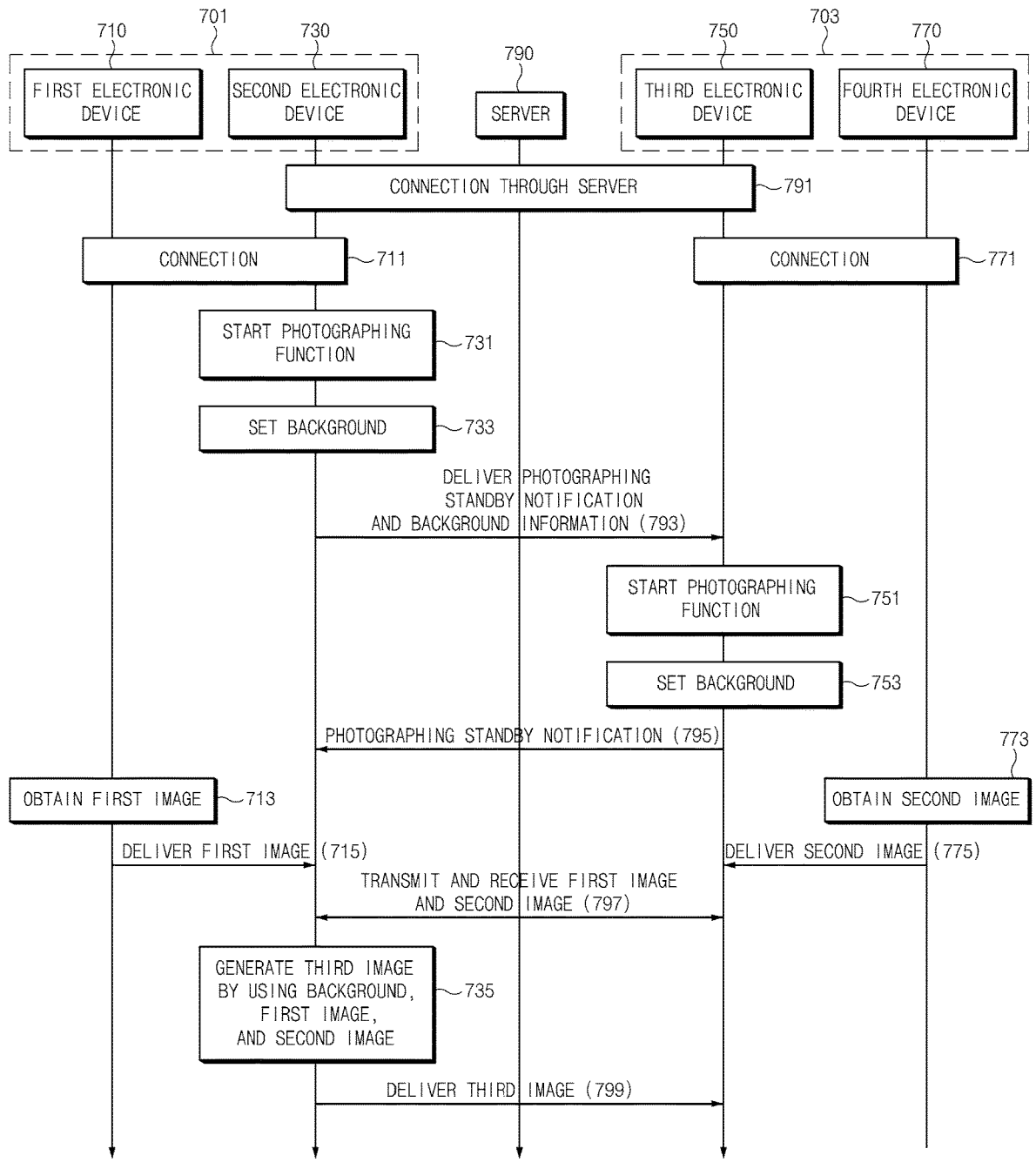
FIG. 7 is a view a photographing method for a plurality of users in a VR environment according to an embodiment of the disclosure.

FIG. 7 is a view a photographing method for a plurality of users in a VR environment according to an embodiment of the disclosure.

Referring to FIG. 7, a first user 701 and a second user 703 may use contents that provide the same virtual environment. For example, the first user 701 and the second user 703 may use the same VR contents. In some embodiments, the first user 701 and the second user 703 may feel as if they were present in the same virtual environment. For example, the second electronic device 730 mounted on the first user 701 may obtain a first image obtained by photographing the first user 701 from the first electronic device 710 that is around the second electronic device 730 and may photograph a subject, and may obtain a second image obtained by photographing the second user 703 from a third electronic device 750 mounted on the second user 703. Further, the second electronic device 730 may generate a third image in which the first user 701 and the second user 703 are in the same virtual environment by merging the first image and the second image into the VR image included in the VR contents.

To achieve the above-mentioned functions, in operation 791, the second electronic device 730 and the third electronic device 750 may be connected to each other through a server 790. The second electronic device 730 and the third electronic device 750 connected to each other through the server 790 may provide the same virtual environment to the first user 701 and the second user 703.

If the second electronic device 730 and the third electronic device 750 are connected to each other, in operation 711, the second electronic device 730 may be connected to the first electronic device 710 that is around the second electronic device 730 and may photograph the subject. Further, in operation 771, the third electronic device 750 also may be connected to a fourth electronic device 770 that is around the third electronic device 750 and may photograph the subject. According to various embodiments, at least one of operations 711 and 771 may be performed before performance of operation 791.

If the first electronic device 710 and the second electronic device 730 are connected to each other, in operation 731, the second electronic device 730 may start a photographing function. According to an embodiment, the second electronic device 730 may start a selfie capturing function. As an example, the second electronic device 730 may be prepared to allow the first user 701 to have an experience of capturing a selfie in a virtual environment.

In operation 733, the second electronic device 730 may set a background of a virtual capture image by using at least a part of the VR image. According to an embodiment, the second electronic device 730 may set a background of a virtual captured image based on the field of view (FOV) of the VR image. As an example, the second electronic device 730 may set an image output in a current screen area of the VR image as a background of the virtual captured image. In some embodiments, the second electronic device 730 may change a structure of a background of a virtual capture image based on sensing data obtained through a sensor module or a user input received through an input device.

If the background of the virtual capture image is set, in operation 793, the second electronic device 730 may deliver a photographing standby notification and set background information to the third electronic device 750. As an example, the second electronic device 730 may transmit a command (or a signal) related to start of a photographing function to the third electronic device 750. Further, the second electronic device 730 may transmit the set background information together with the command.

If receiving the photographing standby notification (e.g., a command related to the start of the photographing function), in operation 751, the third electronic device 750 may start the photographing function. For example, the third electronic device 750 may start a selfie capturing function.

In operation 753, the third electronic device 750 may set a background for capturing a selfie based on the background information received together with the photographing standby notification. For example, the third electronic device 750 may set a background of a virtual capture image such that the background of the virtual capture image may be the same as the background set by the second electronic device 730. According to an embodiment, if the backgrounds of the second electronic device 730 and the third electronic device 750 are set in operations 733 and 753, the background may not be changed by the motions of the electronic devices (e.g., the first electronic device 710, the second electronic device 730, the third electronic device 750, and the fourth electronic device 770) generated after operations 733 and 753.

If the background is completely set, in operation 795, the third electronic device 750 may deliver the photographing standby notification to the second electronic device 730. As an example, the third electronic device 750 may transmit a signal that informs that preparation for photographing is completed to the second electronic device 730. Further, the third electronic device 750 may inform the second user 703 that the setting of the background is completed. As an example, the third electronic device 750 may output a display object corresponding to notification information through a display. As another example, the third electronic device 750 may output a voice corresponding to notification information through a voice output device (e.g., a speaker). Meanwhile, the second user 703 who identified the notification information may select a photographing button, and accordingly, as in operation 773, the fourth electronic device 770 may obtain a second image through the camera. The second image, for example, may be an image obtained by photographing the second user 703. In operation 775, the fourth electronic device 770 may deliver the second image to the third electronic device 750.

If receiving the photographing standby notification, the second electronic device 730 may inform the first user 701 that the second user 703 is prepared to photograph the subject. As an example, the second electronic device 730 may output a display object corresponding to notification information through a display. As another example, the second electronic device 730 may output a voice corresponding to notification information through a voice output device (e.g., a speaker). Meanwhile, the first user 701 who identified the notification information may select a photographing button, and accordingly, as in operation 713, the first electronic device 710 may obtain a first image through the camera. The first image, for example, may be an image obtained by photographing the first user 701. In operation 715, the first electronic device 710 may deliver the first image to the second electronic device 730.

As in operation 797, the second electronic device 730 that obtained the first image may deliver the first image to the third electronic device 750, and the third electronic device 750 that obtained the second image may deliver the second image to the second electronic device 730. In some embodiments, the second electronic device 730 may not deliver the first image to the third electronic device 750.

In operation 735, the second electronic device (e.g., the processor 730) may generate a third image by using the set background, the first image, and the second image. As an example, the second electronic device 730 may extract objects corresponding to the first user 701 and the second user 703 from the first image and the second image, and may generate the third image by merging the extracted objects into the background. In some embodiments, if receiving the second image from the fourth electronic device 770 in operation 775, the third electronic device 750 may extract objects corresponding to the second user 703 from the second image and in operation 797, may deliver information on the extracted objects to the second electronic device 730. In this case, the second electronic device 730 may extract an object corresponding to the first user 701 from the first image, and may generate the third image by merging the extracted object and an object corresponding to the second user 703 into the background.

In operation 799, the second electronic device 730 may deliver the third image to the third electronic device 750. Accordingly, the second electronic device 730 and the third electronic device 750 may obtain the third image that is felt as if the first user 701 and the second user 703 were photographed together in the same virtual space. In some embodiments, the third electronic device 750 may generate the third image.

Figure 8:
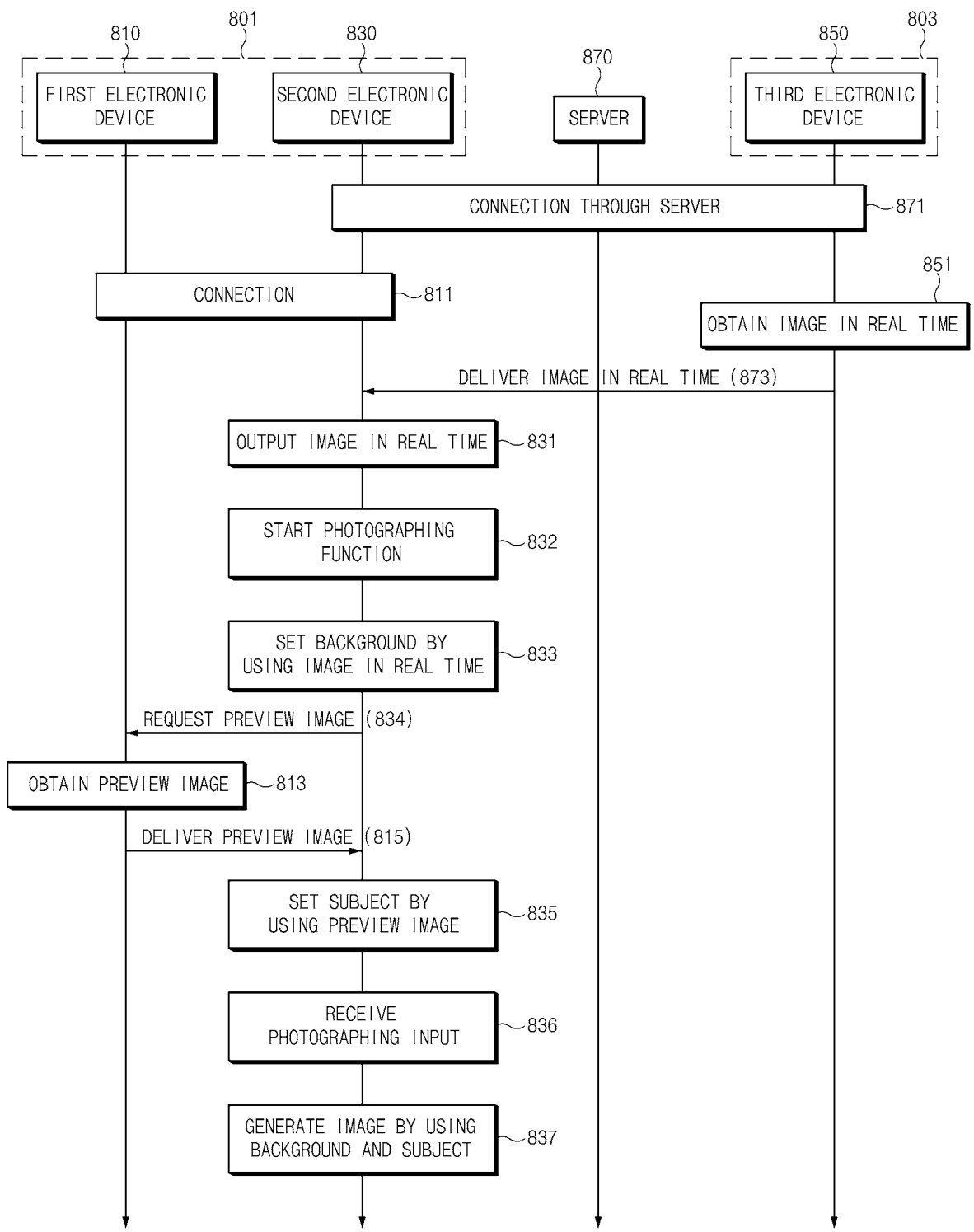
FIG. 8 is a view illustrating a photographing method in a VR environment provided in real time according to an embodiment of the disclosure.

FIG. 8 is a view illustrating a photographing method in a VR environment provided in real time according to an embodiment of the disclosure.

Referring to FIG. 8, the second electronic device 830 may obtain an image that is virtually captured as if the first user 801 existed in a space in which the second user 803 actually exists. In operation 871, the second electronic device 830 may be connected to the third electronic device 850 through a server 870. The third electronic device 850 may obtain the image captured in real time by the second user 803 in operation 851, and may deliver the obtained image to the second electronic device 830 in operation 873.

In operation 811, the second electronic device 830 may be connected to the first electronic device 810 that is around the second electronic device 830 and may photograph a subject. Operation 811 may be performed at any time before operation 834. For example, operation 811 may be performed before operation 871, and may be performed after operation 833.

In operation 831, the second electronic device 830 may output an image obtained from the third electronic device 850 on a display. In operation 832, the second electronic device 830 may start a photographing function. For example, the second electronic device 830 may start a photographing function through a series of operations described with reference to FIG. 4.

In operation 833, the second electronic device 830 may set a background of a virtual capture image by using at least a part of the image obtained from the third electronic device 850. According to an embodiment, the second electronic device 830 may set a background of a virtual captured image based on the field of view (FOV) of the image. As an example, the second electronic device 830 may set an image output in a current screen area of the image as a background of the virtual captured image. In some embodiments, the second electronic device 830 may change a structure of a background of a virtual capture image based on sensing data obtained through a sensor module or a user input received through an input device.

In operation 834, the second electronic device 830 may request a preview image from the first electronic device 810. The preview image, for example, may be a preparation image for photographing the user of the second electronic device 830.

If receiving the request for the preview image, in operation 813, the first electronic device 810 may obtain a preview image through a camera. Further, in operation 815, the first electronic device 810 may deliver the obtained preview image to the second electronic device 830.

In operation 835, the second electronic device 830 that received the preview image may set a subject for a virtual captured image. According to an embodiment, the second electronic device 830 may extract a specific object from the preview image received from the first electronic device 810, and may set the extracted object as an object corresponding to the subject. As an example, the second electronic device 830 may set the user of the second electronic device 830 as a subject. In this case, the second electronic device 830 may extract an object corresponding to the user of the second electronic device 830 from the preview image.

In operation 836, the second electronic device 830 may receive a photographing input. As an example, the second electronic device 830 may receive a user input for selecting a photographing button (e.g., a shutter) included in the second electronic device 830. If receiving the photographing input, in operation 837, the second electronic device 830 may generate a virtual captured image by using the background and the subject. According to an embodiment, the second electronic device 830 may generate the virtual captured image by merging an object corresponding to the subject into the background.

Figure 9:
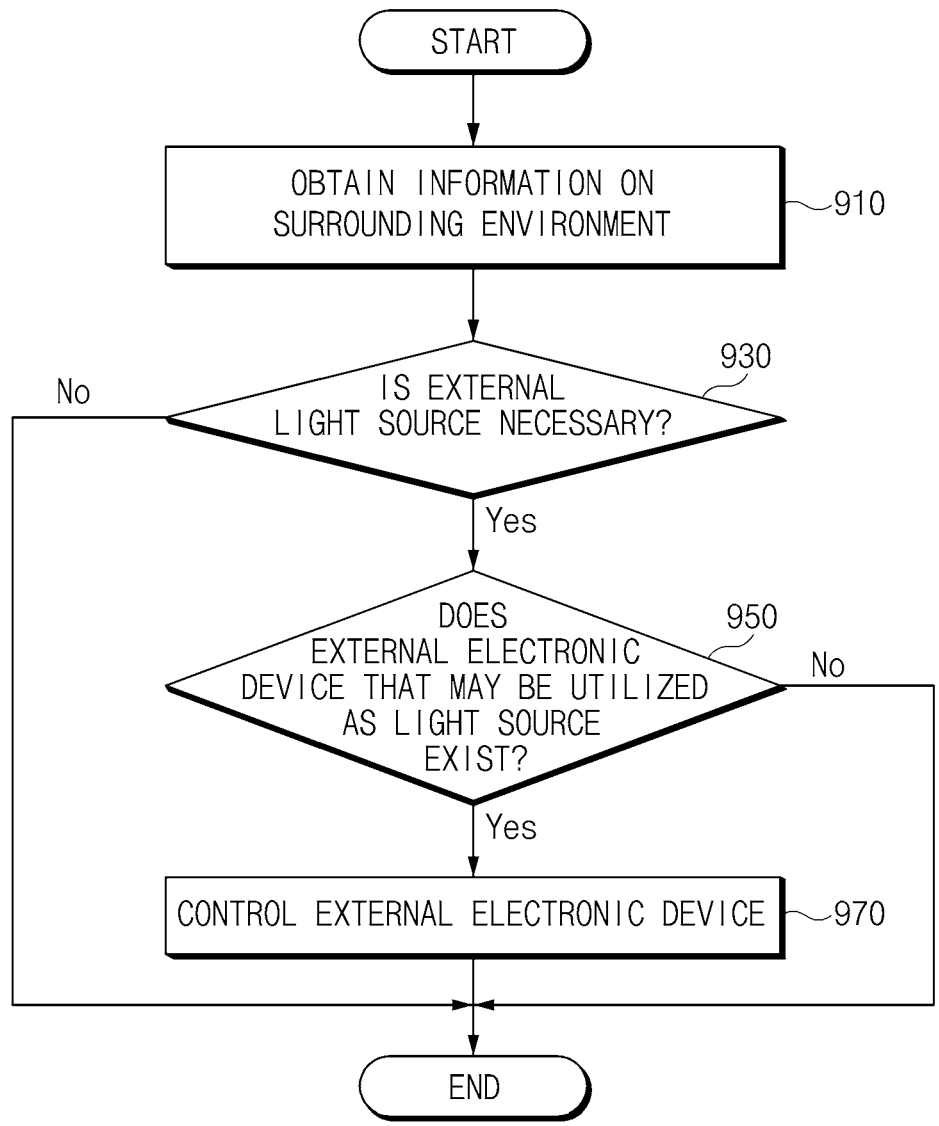
FIG. 9 is a view illustrating a method for controlling an external electronic device based on information on a surrounding environment according to an embodiment of the disclosure.

FIG. 9 is a view illustrating a method for controlling an external electronic device based on information on a surrounding environment according to an embodiment of the disclosure.

Referring to FIG. 9, in operation 910, an electronic device (e.g., the electronic device 100) may obtain information on a surrounding environment. As an example, the electronic device (e.g., the processor 110) may obtain an intensity of illumination through an illumination sensor.

In operation 930, the electronic device (e.g., the processor 110) may determine whether an external light source is necessary. As an example, the electronic device (e.g., the processor 110) may determine whether the intensity of illumination obtained through the illumination sensor satisfies a specific value. The electronic device (e.g., the processor 110) may determine that an external light source is necessary when the intensity of illumination is less than a specific value, and may determine that an external light source is not necessary when the intensity of illumination is not less than the specific value.

When it is determined that the external light source is necessary, in operation 950, the electronic device (e.g., the processor 110) may determine whether there exists an external electronic device that may be utilized as a light source. According to an embodiment, the electronic device (e.g., the processor 110) may deliver a service discovery request to the external electronic device around the electronic device by using a service discovery protocol (SDP) based on a communication module (e.g., the communication module 120), and may receive a response to the service discovery request from the external electronic device. The electronic device (e.g., the processor 110) may determine a service capacity or a device capacity of the external electronic device based on a response to the service discovery request. Through this, the electronic device (e.g., the processor 110) may determine an external electronic device (e.g., an electronic device including a light-emitting diode (LED) or a display), which may emit light, of the external electronic devices around the electronic device.

When there exists an external electronic device that may be utilized as the light source, in operation 970, the electronic device (e.g., the processor 110) may control the external electronic device. As an example, the electronic device (e.g., the processor 110) may utilize the external electronic device as a light when photographing a subject through the camera.

As described above, according to various embodiments, a photographing method using an external electronic device of an electronic device may include outputting a first image included in contents that realize a virtual reality on a display, identifying a first external electronic device that is around the electronic device, determining whether it is possible for the first external electronic device to photograph a subject by using a camera of the first external electronic device, transmitting a command to the first external electronic device through a communication circuit in response to a determination result that it is possible for the first external electronic device to photograph the subject by using the camera, receiving a second image photographed based on the command from the first external electronic device through the communication circuit, and generating a third image based on the first image and the second image.

According to various embodiments, the photographing method may further include outputting the third image on the display or a display device detachably connected to the electronic device.

According to various embodiments, the receiving of the second image may include receiving an image obtained by photographing a user of the electronic device as the second image.

According to various embodiments, the photographing method may further include extracting an object corresponding to the subject included in the second image, and the generating of the third image may include generating the third image by merging at least a part of the first image and the object.

According to various embodiments, the photographing method may further include correcting a partial area of the object.

According to various embodiments, the generating of the third image may include selecting at least a part of the first image based on at least one of first sensing data obtained through a first sensor module included in the electronic device, second sensing data obtained through a second sensor module included in the first external electronic device, and a user input, and using the selected at least a part of the first image when the third image is generated.

According to various embodiments, the receiving of the second image may include changing a photographing angle of the subject of the second image based on at least one of first sensing data obtained through a first sensor module included in the electronic device and second sensing data obtained through a second sensor module included in the first external electronic device.

According to various embodiments, the photographing method may further include obtaining surrounding environment information of at least one of the electronic device and the first external electronic device, determining whether an external light source for photographing is necessary, based on the obtained surrounding environment information, determining whether there exists a second external electronic device that is able to be utilized as the external light source, and controlling the second external electronic device in response to the determination result that there exists the second external electronic device.

According to various embodiments, the photographing method may further include providing an interface such that the first external electronic device or a second external electronic device that is around the electronic device and is able to photograph the subject is selected, in response to the determination result that there exists the second external electronic device, and receiving the second image from the selected external electronic device in response to selection of the first external electronic device or the second external electronic device.

According to various embodiments, the photographing method may further include receiving the contents or the first image from a second external electronic device connected to the electronic device through the communication circuit.

Figure 10:
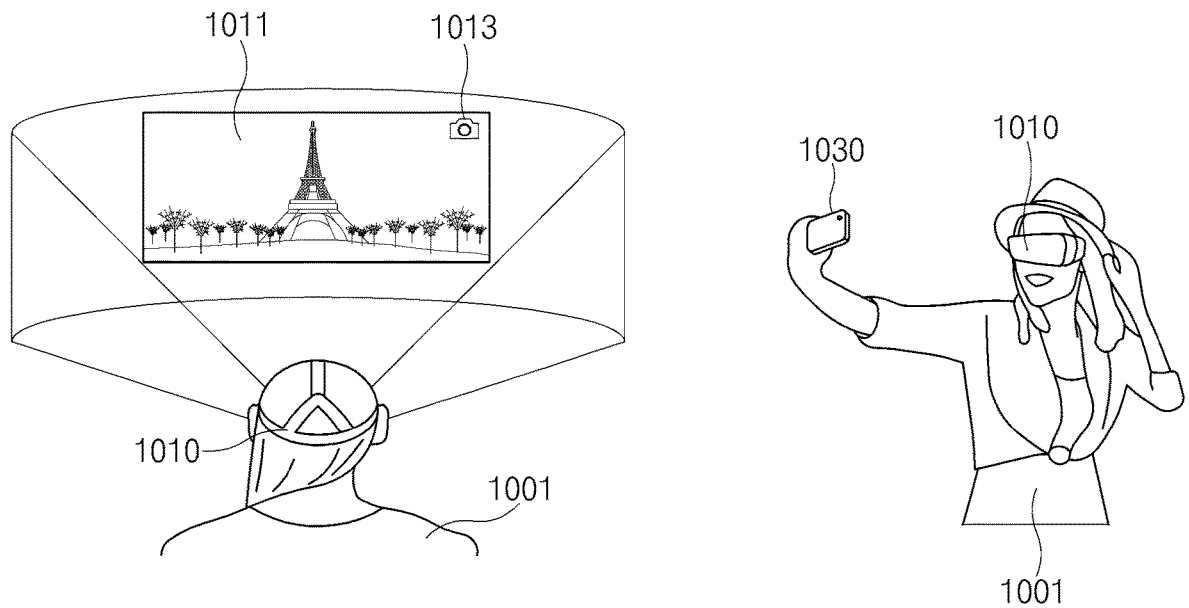
FIG. 10 is a view of a screen that provides a user interface for photographing using an external electronic device according to an embodiment of the disclosure.

FIG. 10 is a view of a screen that provides a user interface for photographing using an external electronic device according to an embodiment of the disclosure.

Referring to FIG. 10, a first electronic device 1010 (e.g., the electronic device 100) may output a VR image 1011 included in the contents on a display. Further, the first electronic device 1010 may identify whether there exists an external electronic device that is around the first electronic device 1010 and includes a camera that may photograph a user 1001. As an example, the first electronic device 1010 may deliver a service discovery request to the second electronic device 1030 (e.g., the electronic device 200). The service discovery request may be a kind of message (or signal) generated based on a service discovery protocol (SDP).

The second electronic device 1030 that received the service discovery request may deliver a response (service discovery response) to the service discovery request to the first electronic device 1010. The service discovery response also is a kind of message (or signal) generated based on the SDP, and may include information, such as a service capacity or a device capacity of the second electronic device 1030. The first electronic device 1010 that received the service discovery response may determine whether the second electronic device 1030 includes a camera and may photograph a subject.

When there exists an external electronic device that may photograph a subject, that is, when the second electronic device 1030 may photograph a subject, the first electronic device 1010 may output a display object 1013 that informs that an object may be photographed by using the second electronic device 1030. As an example, the first electronic device 1010 may output an icon 1013 of the second electronic device 1030 in a partial area (e.g., a right upper end area) of the display on which the VR image is output.

Figure 11:
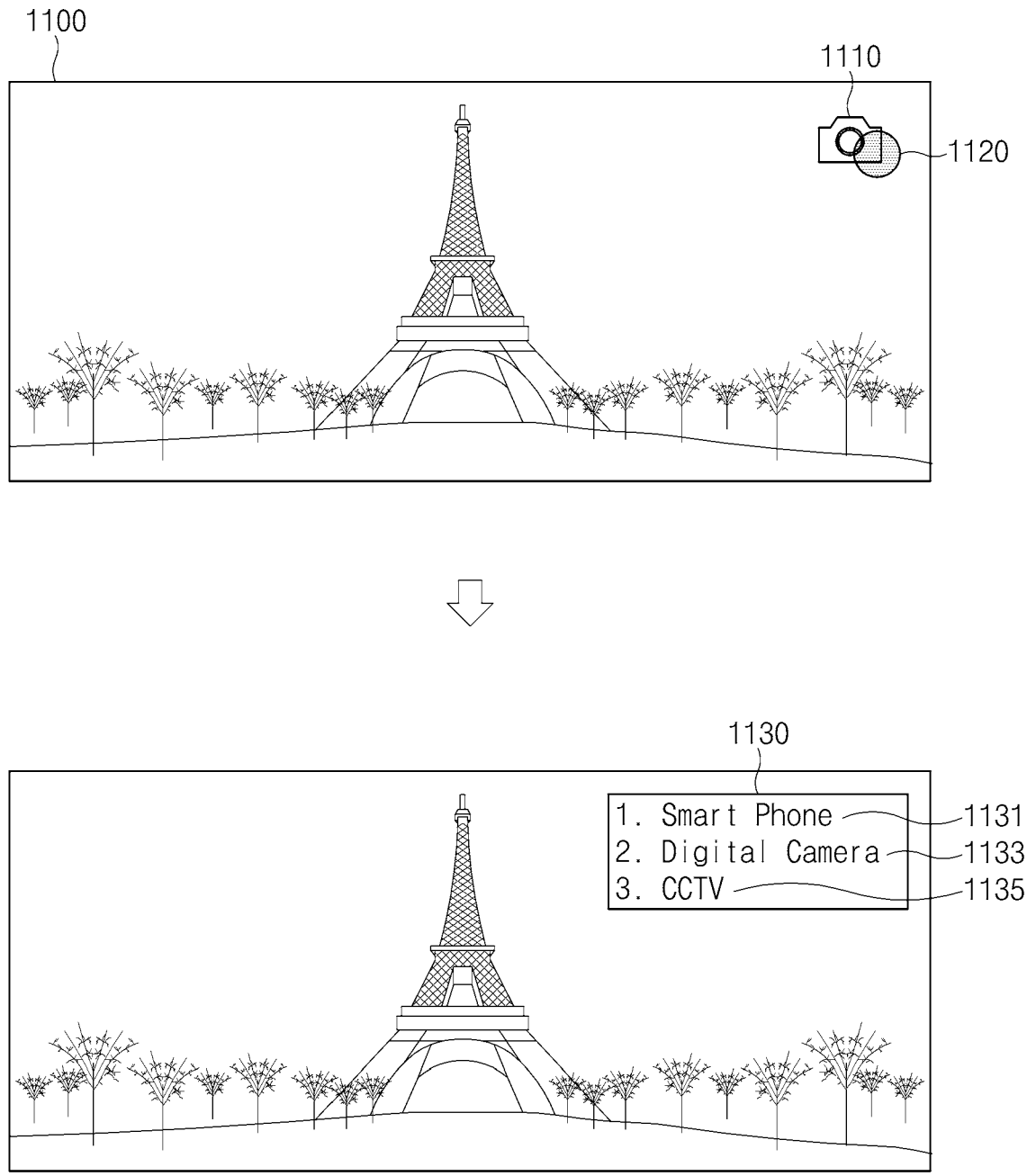
FIG. 11 is a view of a screen that provides a user interface when there exists a plurality of external electronic devices that may photograph a subject according to an embodiment of the disclosure.

FIG. 11 is a view of a screen that provides a user interface when there exists a plurality of external electronic devices that may photograph a subject according to an embodiment of the disclosure.

Referring to FIG. 11, when there exists a plurality of external electronic devices (e.g., the electronic device 200) that may photograph a subject, an electronic device (e.g., the electronic device 100) may output a display object 1110 that informs that there exists an external electronic device that may photograph a subject in a partial area (e.g., a right upper end area) of a display 1100. Further, when a user input 1120 for selecting the display object 1110 is generated, the electronic device may output display objects 1131, 1133, and 1135 corresponding to identification information of the plurality of external electronic devices in a partial area (e.g., a right upper end area) of the display 1100. The display object corresponding to the identification information of the external electronic device, for example, may include a text object corresponding to the kind of the external electronic device, the product name, or the product number of the external electronic device. Further, the display object corresponding to the identification information of the external electronic device may include a product image or an icon of the external electronic device. In some embodiments, the electronic device may bind the display objects corresponding to the identification information of the external electronic device into groups 1130 according to characteristics of the external electronic device.

According to various embodiments, when there exists a plurality of external electronic devices that may photograph a subject, the electronic device may provide images (e.g., preview images) captured in advance. For example, if a user input 1120 for selecting the display object 1110 is generated, the electronic device may obtain a preview image from the plurality of external electronic devices and may output the obtained preview images on a display together with the identification information of the external electronic devices. In this case, the electronic device may divide a screen area of the display into a plurality of parts such that the obtained preview images are classified, and may output the identification information of the external electronic devices and the preview images obtained from the corresponding external electronic devices in the respective areas. Further, the electronic device may select an external electronic device, which will be used, of the plurality of external electronic devices to the external electronic device allocated to the selected area in response to a user input for selecting one area from the divided area.

Figure 12:
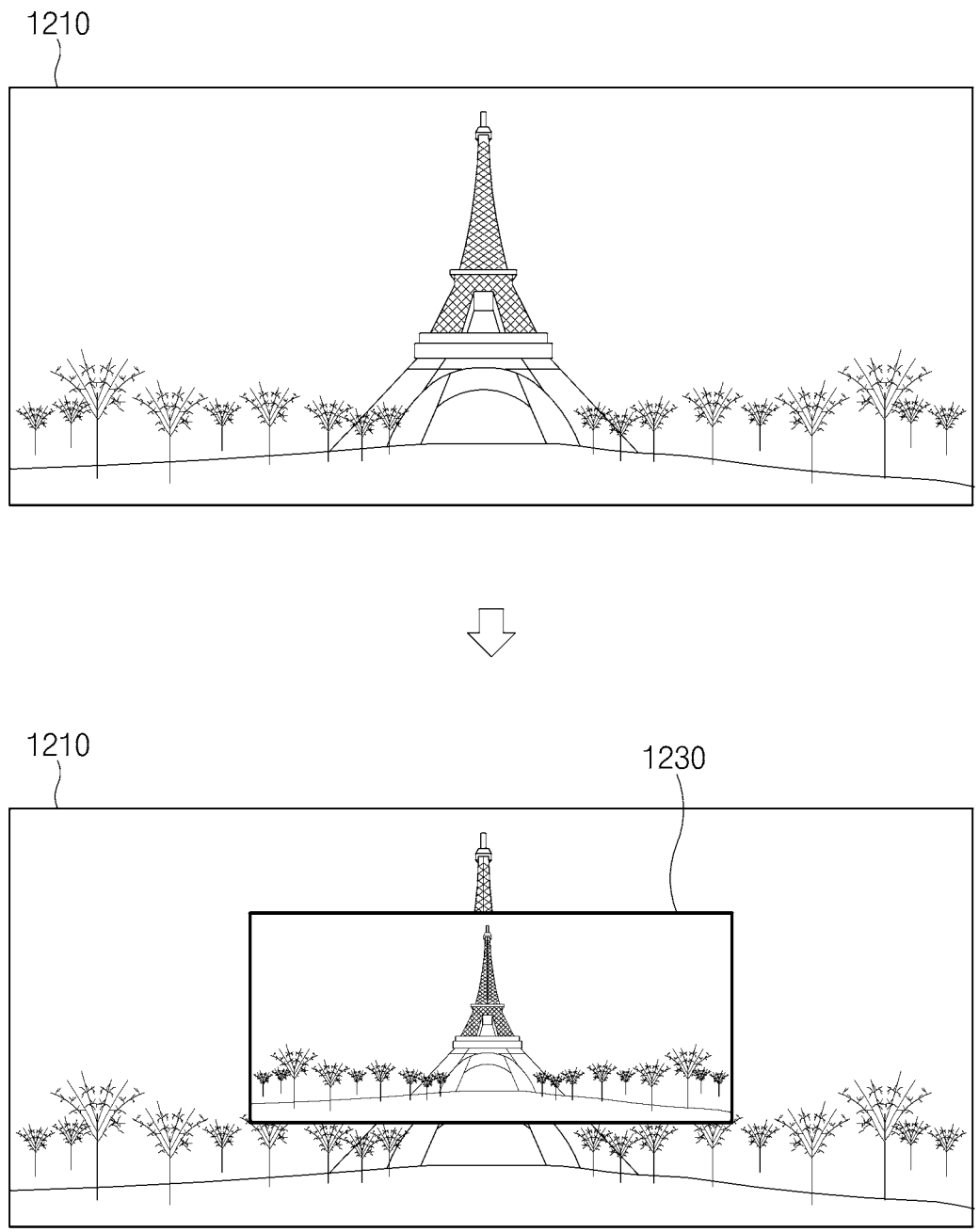
FIG. 12 is a view of a screen for explaining a method for setting a background of an image according to an embodiment of the disclosure.

FIG. 12 is a view of a screen for explaining a method for setting a background of an image according to an embodiment of the disclosure.

Referring to FIG. 12, the electronic device (e.g., the electronic device 100) may set a background of a virtual capture image. According to an embodiment, the electronic device may set a background of a virtual captured image based on the FOV of the VR image output on a display. For example, the electronic device may set an image, which is output in a current screen area 1210, of the VR image as a background 1230 of the virtual capture image. In some embodiments, the electronic device may set the image output in the selected at least a partial area as the background of the virtual capture image based on the user input for selecting at least a part of the screen area 1210. As in the drawing, the set background 1230 may be output at a part of the screen area 1210.

According to an embodiment, the electronic device may not change the background 1230 that has been set once even though the field of view (FOV) of a VR image is changed. For example, even though the user who wears an electronic device (e.g., a HMD) turns the head after the background 1230 is set, the background 1230 of the virtual capture image may not be changed. As another example, if the FOV of the VR image is changed, the electronic device may change (or reset) the background 1230 such that the background 1230 corresponds to the changed FOV. For example, the electronic device may determine a motion of an electronic device based on sensing data, may change the FOV of the VR image based on a direction and a change of the motion, and may change the structure of the background 1230 such that the background 1230 corresponds to the changed viewed of view of the VR image. As another example, the electronic device may change the structure of the background 1230 based on a user input. For example, if a user input (e.g., a flick, a swipe, or a drag) for moving a screen is generated, the electronic device may change the structure of the background 1230 based on the direction and the movement of the user input.

Figure 13:
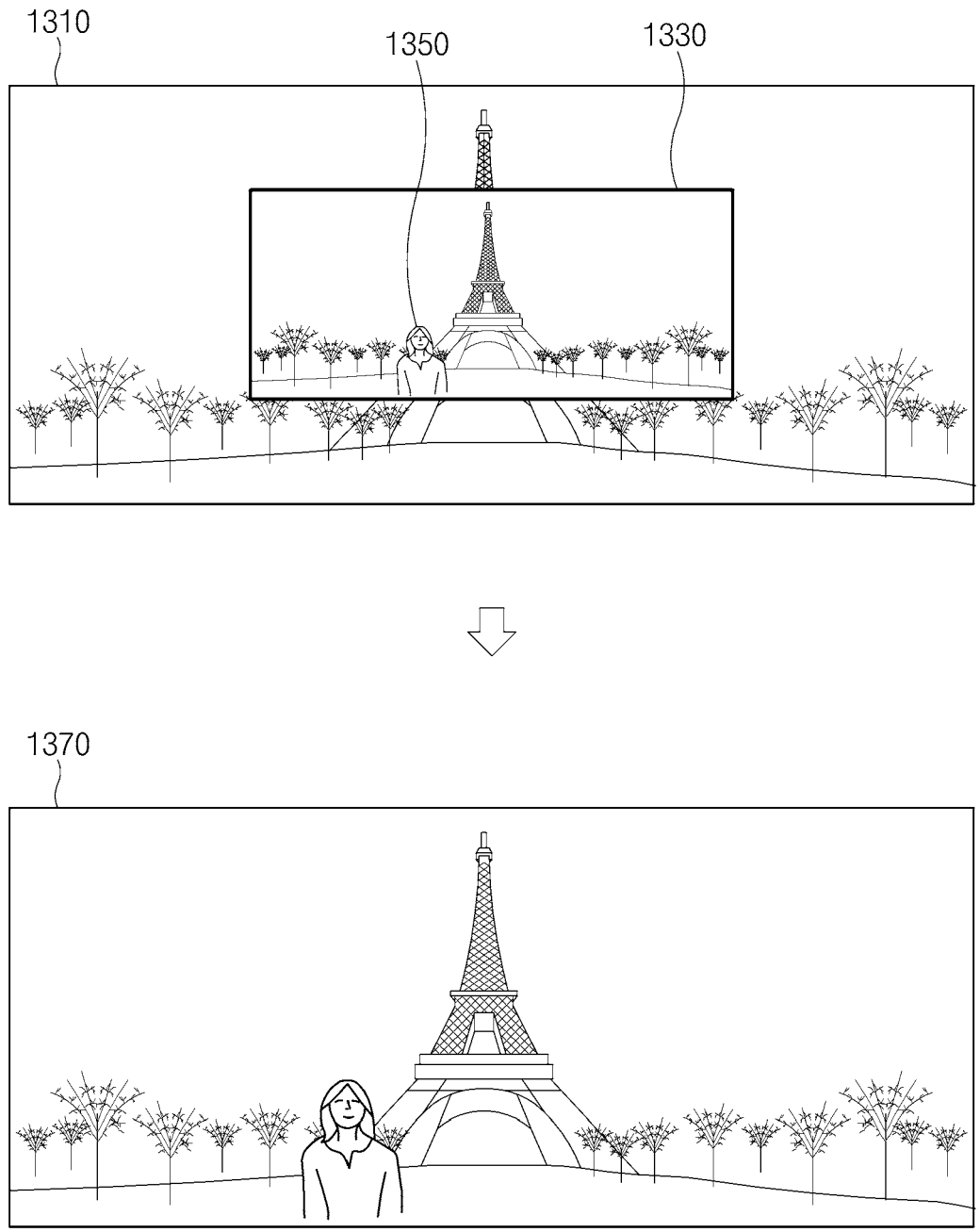
FIG. 13 is a view of a screen for explaining a method for processing a capture image for a subject according to an embodiment of the disclosure.

FIG. 13 is a view of a screen for explaining a method for processing a capture image for a subject according to an embodiment of the disclosure.

Referring to FIG. 13, an electronic device (e.g., the electronic device 100) may set a subject 1350, and may generate a virtual capture image 1370 by merging the set subject 1350 and the backgrounds 1310 and 1330. According to an embodiment, the electronic device may extract a specific object from an image received from an external electronic device (e.g., the electronic device 200), and may set the extracted object as a subject. Further, the electronic device may generate a virtual capture image 1370 that is felt as if the subject 1350 were in the background 1330 by merging the subject 1350 into the background 1330.

According to an embodiment, the electronic device may merge the subject 1350 and the background 1330 by correcting the subject 1350 when the subject 1350 and the background 1330 are merged. For example, when the subject 1350 corresponds to a user who wears the electronic device, it looks as if the user was not actually in a virtual environment (or a VR environment) when the user wears the electronic device. Accordingly, the electronic device may correct a part of the subject 1350, in which the electronic device is mounted. As an example, the electronic device may replace the electronic device (e.g., an HMD) mounted on the user by another accessory (e.g., sunglasses) corresponding to the shape of the electronic device. Further, the electronic device may correct the subject 1350 based on the image of the user stored in a memory.

Figure 14:
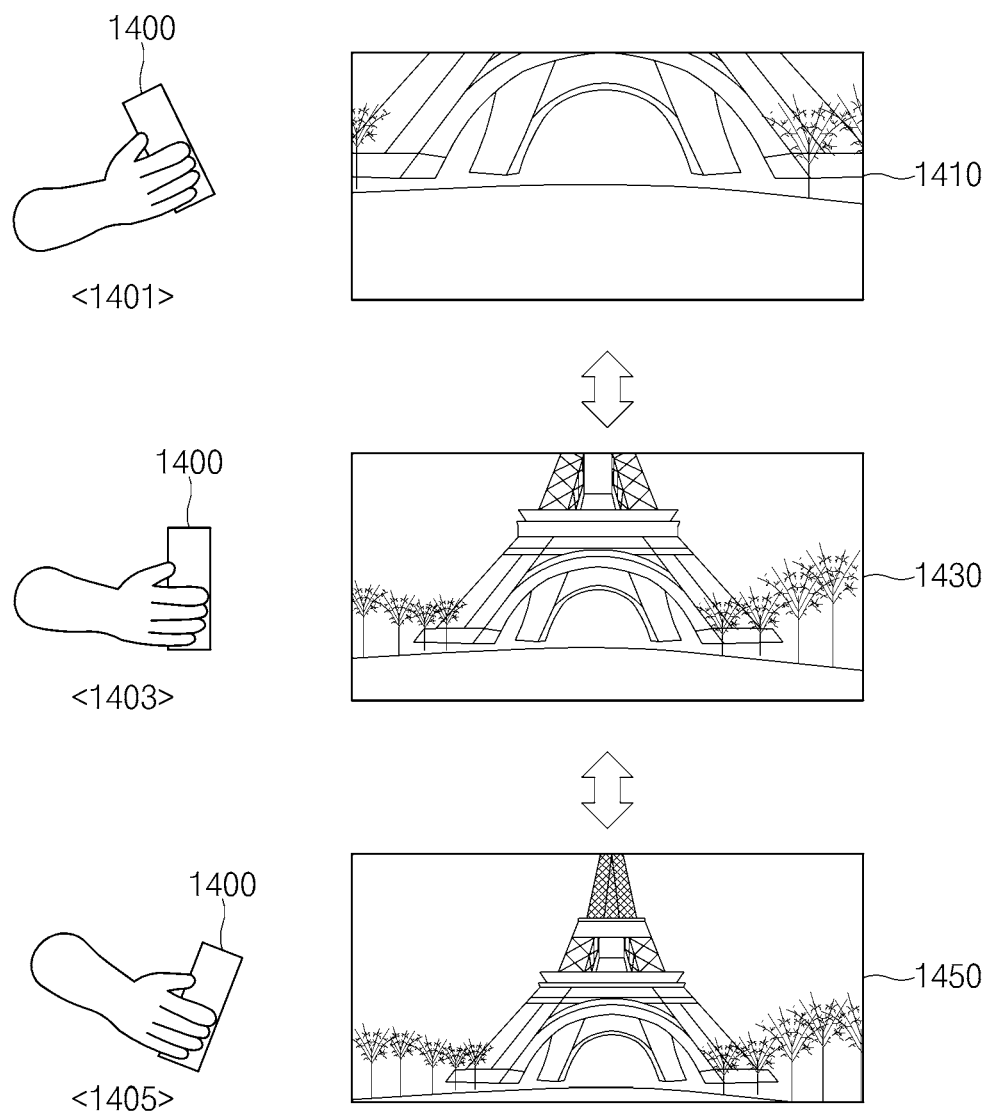
FIG. 14 is a view of a screen for explaining a method for setting a background of an image by using an external electronic device according to an embodiment of the disclosure.

FIG. 14 is a view of a screen for explaining a method for setting a background of an image by using an external electronic device according to an embodiment of the disclosure.

Referring to FIG. 14, an electronic device (e.g., the electronic device 100) may change the structure of a background of a virtual capture image based on sensing data received from an external electronic device 1400 (e.g., the electronic device 200) connected through a communication module. For example, the electronic device may determine a motion of the external electronic device 1400 including a camera based on the sensing data, and may change the structure of a background of a virtual capture image based on a direction and a change of a motion of the external electronic device 1400.

A second state 1403 illustrated represents a state in which an electronic device sets an image output in a current screen area as a background 1430 of the virtual capture image. Then, as in a first state 1401, if the user lifts the external electronic device 1400, the electronic device may determine a motion of the external electronic device 1400 by analyzing the sensing data obtained from the external electronic device 1400 and may change the background 1430 of a first structure to a background 1410 of a second structure based on a direction and a change of the motion of the external electronic device 1400. Similarly, as in a third state 1405, if the user lowers the external electronic device 1400, the electronic device may change the background 1430 of the first structure to the background 1450 of the third structure.

Figure 15:
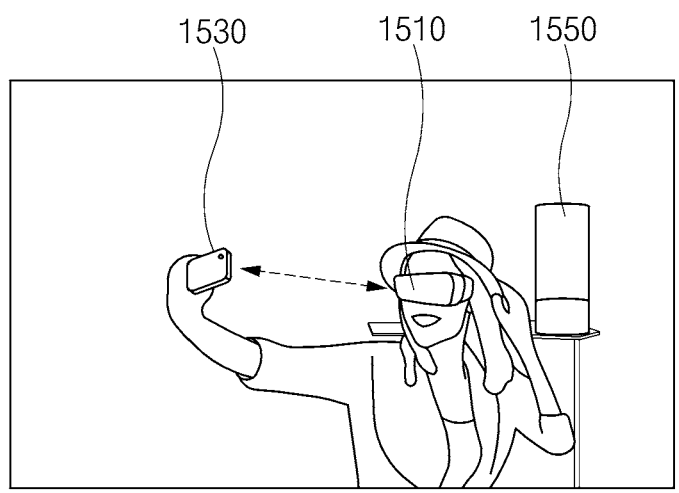
FIG. 15 is a view of a screen for explaining a method for controlling an external electronic device based on information on a surrounding environment according to an embodiment of the disclosure.

FIG. 15 is a view of a screen for explaining a method for controlling an external electronic device based on information on a surrounding environment according to an embodiment of the disclosure.

Referring to FIG. 15, an electronic device 1510 (e.g., the electronic device 100) may determine whether an external light source is necessary when a subject is photographed by using a first external electronic device 1530 (e.g., the second electronic device 200) including a camera. For example, the electronic device 1510 may obtain an intensity of illumination through an illumination sensor, and may determine whether the obtained intensity of illumination satisfies a specific value. When the intensity of illumination is less than the specific value, the electronic device 1510 may determine that the external light source is necessary, and when the external light source is necessary, the electronic device 1510 may determine whether there exists a second external electronic device 1550 that may be utilized as a light source.

According to an embodiment, the electronic device 1510 may deliver a service discovery request to the external electronic device around the electronic device 1510 by using a service discovery protocol (SDP) based on the communication module, and may receive a response to the service discovery request from the external electronic device. The electronic device 1510 may determine a service capacity or a device capacity of the external electronic device based on a response to the service discovery request. Through this, the electronic device 1510 may determine a second external electronic device (e.g., an electronic device including an LED or a display), which may emit light, of the second external electronic devices around the electronic device 1510.

When there exists the second external electronic device 1550 that may be utilized as the light source, the electronic device 1510 may control the second external electronic device 1550 to emit light. That is, the electronic device 1510 may utilize the second external electronic device 1550 as a light.

Figure 16:
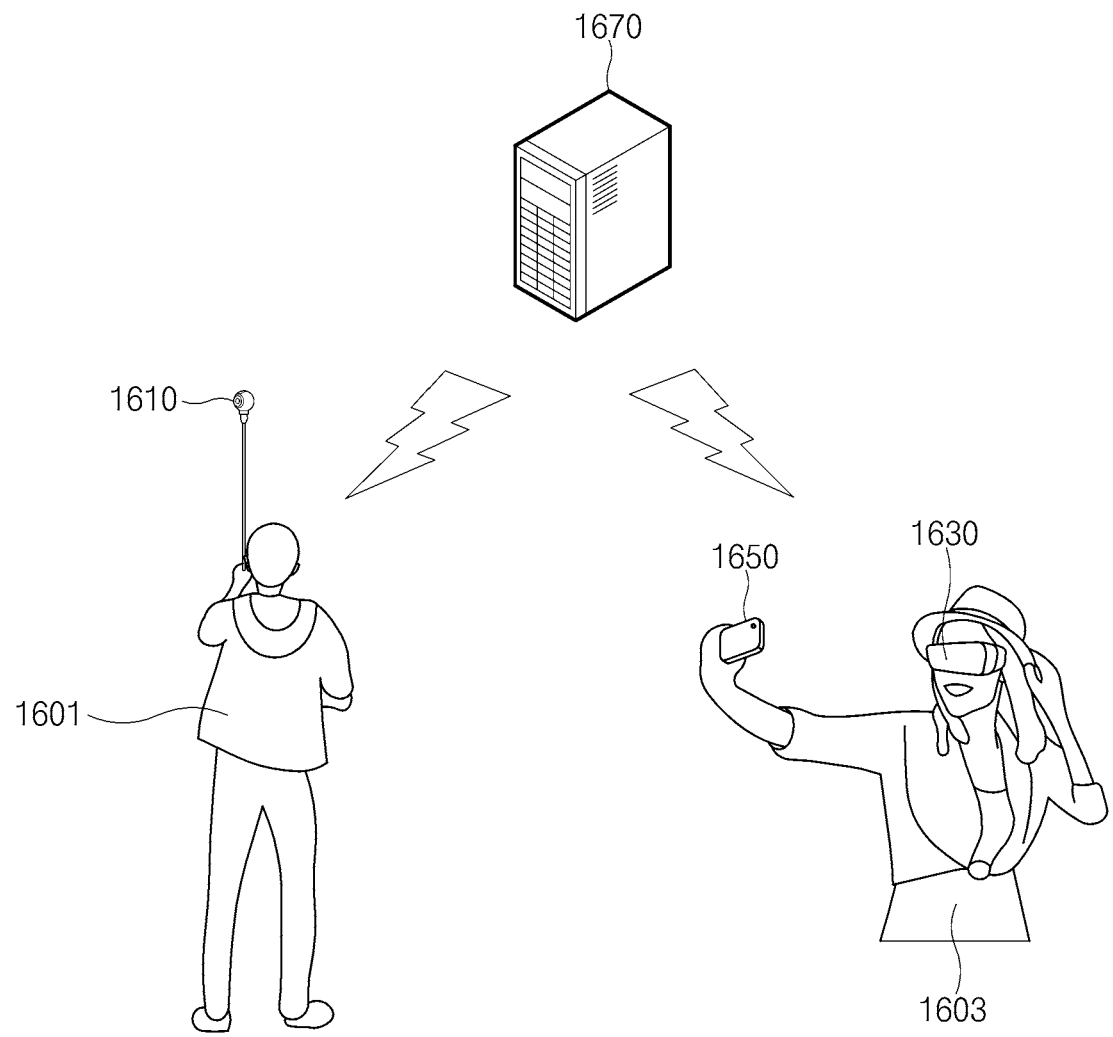
FIG. 16 is a view of a screen for explaining a photographing method in a VR environment provided in real time according to an embodiment of the disclosure.

FIG. 16 is a view of a screen for explaining a photographing method in a VR environment provided in real time according to an embodiment of the disclosure.

Referring to FIG. 16, the second electronic device 1630 may obtain an image that is virtually captured as if a second user 1601 existed in a space in which a first user 1603 actually exists. For example, even though the first user 1601 and the second user 1603 are spaced apart from each other, the second electronic device 1630 may generate a virtual capture image that is felt as if the second user 1603 were together with the first user 1601 in a space in which the first user 1601 actually exists by obtaining an image obtained by photographing a space in which the first user 1601 exists and an image obtained by photographing the second user 1603 to merge the images.

The first electronic device 1610 may be a device including a camera (e.g., a 360-degree camera) that may photograph a space in which the first user 1601 actually exists, and may be connected to the second electronic device 1630 through a server 1670. Further, the first electronic device 1670 may deliver the captured image to the second electronic device 1630 through the server 1670.

The second electronic device 1630 may be a device (e.g., an HMD) mounted on the second user 1603, and may obtain an image captured in real time from the first electronic device 1610. Further, the second electronic device 1630 may obtain an image obtained by photographing the second user 1603 from a third electronic device 1650 (e.g., a smartphone) that is around the second electronic device 1630 and includes a camera.

The second electronic device 1630 may set a background of a virtual capture image by using at least a part of the image obtained from the first electronic device 1610, and may extract an object corresponding to the second user 1603 from the image obtained from the third electronic device 1650 to set a subject. If the background and the subject are set, the second electronic device 1630 may generate a virtual capture image by merging the background and the subject.

Figure 17:
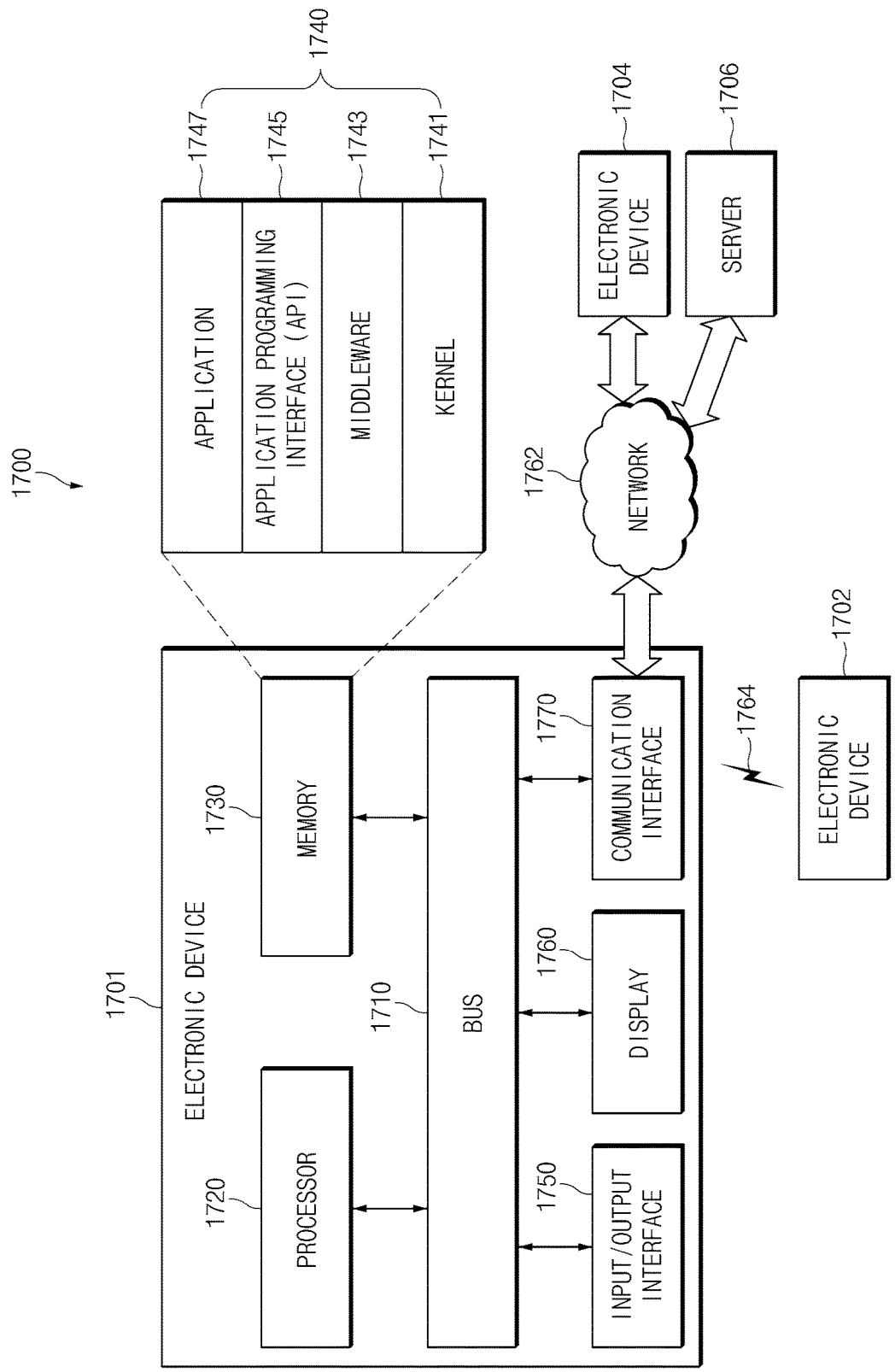
FIG. 17 illustrates an electronic device in a network environment according to an embodiment of the disclosure.

FIG. 17 illustrates an electronic device in a network environment according to an embodiment of the disclosure.

An electronic device 1701 in a network environment 1700 according to various embodiments of the disclosure will be described with reference to FIG. 17. The electronic device 1701 may include a bus 1710, a processor 1720 (at least one processor), a memory 1730, an input/output interface 1750, a display 1760, and a communication interface 1770 (e.g., a transceiver). In various embodiments of the disclosure, at least one of the foregoing elements may be omitted or another element may be added to the electronic device 1701.

The bus 1710 may include a circuit for connecting the above-mentioned elements 1710 to 1770 to each other and transferring communications (e.g., control messages and/or data) among the above-mentioned elements.

The processor 1720 may include at least one of a central processing unit (CPU), an application processor (AP), or a communication processor (CP). The processor 1720 may perform data processing or an operation related to communication and/or control of at least one of the other elements of the electronic device 1701.

The memory 1730 may include a volatile memory and/or a nonvolatile memory. The memory 1730 may store instructions or data related to at least one of the other elements of the electronic device 1701. According to an embodiment of the disclosure, the memory 1730 may store software and/or a program 1740. The program 1740 may include, for example, a kernel 1741, a middleware 1743, an application programming interface (API) 1745, and/or an application program (or an application) 1747. At least a portion of the kernel 1741, the middleware 1743, or the API 1745 may be referred to as an operating system (OS).

The kernel 1741 may control or manage system resources (e.g., the bus 1710, the processor 1720, the memory 1730, or the like) used to perform operations or functions of other programs (e.g., the middleware 1743, the API 1745, or the application program 1747). Furthermore, the kernel 1741 may provide an interface for allowing the middleware 1743, the API 1745, or the application program 1747 to access individual elements of the electronic device 1701 in order to control or manage the system resources.

The middleware 1743 may serve as an intermediary so that the API 1745 or the application program 1747 communicates and exchanges data with the kernel 1741.

Furthermore, the middleware 1743 may handle one or more task requests received from the application program 1747 according to a priority order. For example, the middleware 1743 may assign at least one application program 1747 a priority for using the system resources (e.g., the bus 1710, the processor 1720, the memory 1730, or the like) of the electronic device 1701. For example, the middleware 1743 may handle the one or more task requests according to the priority assigned to the at least one application, thereby performing scheduling or load balancing with respect to the one or more task requests.

The API 1745, which is an interface for allowing the application 1747 to control a function provided by the kernel 1741 or the middleware 1743, may include, for example, at least one interface or function (e.g., instructions) for file control, window control, image processing, character control, or the like.

The input/output interface 1750 may serve to transfer an instruction or data input from a user or another external device to (an)other element(s) of the electronic device 1701. Furthermore, the input/output interface 1750 may output instructions or data received from (an)other element(s) of the electronic device 1701 to the user or another external device.

The display 1760 may include, for example, a liquid crystal display (LCD), a light-emitting diode (LED) display, an organic light-emitting diode (OLED) display, a microelectromechanical systems (MEMS) display, or an electronic paper display. The display 1760 may present various content (e.g., a text, an image, a video, an icon, a symbol, or the like) to the user. The display 1760 may include a touch screen, and may receive a touch, gesture, proximity or hovering input from an electronic pen or a part of a body of the user.

The communication interface 1770 may set communications between the electronic device 1701 and an external device (e.g., a first external electronic device 1702, a second external electronic device 1704, or a server 1706). For example, the communication interface 1770 may be connected to a network 1762 via wireless communications or wired communications so as to communicate with the external device (e.g., the second external electronic device 1704 or the server 1706).

The wireless communications may employ at least one of cellular communication protocols such as long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communication 1764. The short-range communications may include at least one of Wi-Fi, Bluetooth (BT), near field communication (NFC), magnetic stripe transmission (MST), or GNSS.

The MST may generate pulses according to transmission data and the pulses may generate electromagnetic signals. The electronic device 1701 may transmit the electromagnetic signals to a reader device such as a point of sales (POS) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1762 may include at least one of telecommunications networks, for example, a computer network (e.g., local area network (LAN) or wide area network (WAN)), the Internet, or a telephone network.

The types of the first external electronic device 1702 and the second external electronic device 1704 may be the same as or different from the type of the electronic device 1701. According to an embodiment of the disclosure, the server 1706 may include a group of one or more servers. A portion or all of operations performed in the electronic device 1701 may be performed in one or more other electronic devices (e.g., the first electronic device 1702, the second external electronic device 1704, or the server 1706). When the electronic device 1701 should perform a certain function or service automatically or in response to a request, the electronic device 1701 may request at least a portion of functions related to the function or service from another device (e.g., the first electronic device 1702, the second external electronic device 1704, or the server 1706) instead of or in addition to performing the function or service for itself. The other electronic device (e.g., the first electronic device 1702, the second external electronic device 1704, or the server 1706) may perform the requested function or additional function, and may transfer a result of the performance to the electronic device 1701. The electronic device 1701 may use a received result itself or additionally process the received result to provide the requested function or service. To this end, for example, a cloud computing technology, a distributed computing technology, or a client-server computing technology may be used.

Figure 18:
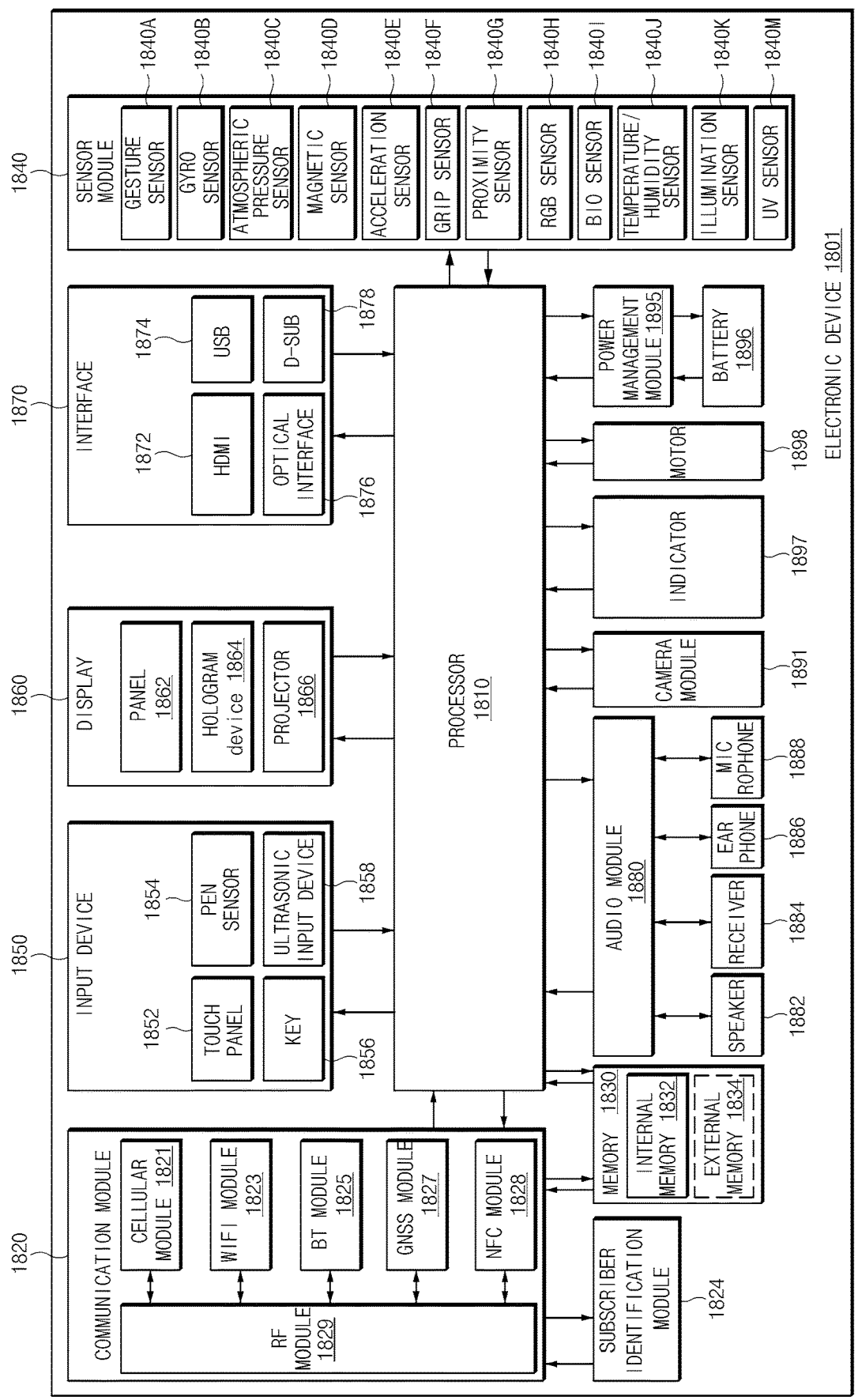
FIG. 18 is a block diagram illustrating an electronic device according to an embodiment of the disclosure.

FIG. 18 is a block diagram illustrating an electronic device according to an embodiment of the disclosure.

Referring to FIG. 18, an electronic device 1801 may include, for example, a part or the entirety of the electronic device 1701 illustrated in FIG. 17. The electronic device 1801 may include at least one processor (e.g., AP) 1810, a communication module 1820 (e.g., a transceiver), a subscriber identification module (SIM) 1824, a memory 1830, a sensor module 1840, an input device 1850, a display 1860, an interface 1870, an audio module 1880, a camera module 1891, a power management module 1895, a battery 1896, an indicator 1897, and a motor 1898.

The processor 1810 may run an operating system (OS) or an application program so as to control a plurality of hardware or software elements connected to the processor 1810, and may process various data and perform operations. The processor 1810 may be implemented with, for example, a system on chip (SoC). According to an embodiment of the present disclosure, the processor 1810 may further include a graphic processing unit (GPU) and/or an image signal processor (ISP). The processor 1810 may include at least a portion (e.g., a cellular module 1821) of the elements illustrated in FIG. 18. The processor 1810 may load, on a volatile memory, an instruction or data received from at least one of other elements (e.g., a nonvolatile memory) to process the instruction or data, and may store various data in a nonvolatile memory.

The communication module 1820 may have a configuration that is the same as or similar to that of the communication interface 1770 of FIG. 17. The communication module 1820 may include, for example, a cellular module 1821, a Wi-Fi module 1823, a BT module 1825, a GNSS module 1827 (e.g., a GPS module, a GLONASS module, a BeiDou module, or a Galileo module), a NFC module 1828, and a radio frequency (RF) module 1829.

The cellular module 1821 may provide, for example, a voice call service, a video call service, a text message service, or an Internet service through a communication network. The cellular module 1821 may identify and authenticate the electronic device 1801 in the communication network using the subscriber identification module (SIM) 1824 (e.g., a SIM card). The cellular module 1821 may perform at least a part of functions that may be provided by the processor 1810. The cellular module 1821 may include a communication processor (CP).

Each of the Wi-Fi module 1823, the BT module 1825, the GNSS module 1827 and the NFC module 1828 may include, for example, a processor for processing data transmitted/received through the modules. According to some various embodiments of the disclosure, at least a part (e.g., two or more) of the cellular module 1821, the Wi-Fi module 1823, the BT module 1825, the GNSS module 1827, and the NFC module 1828 may be included in a single integrated chip (IC) or IC package.

The RF module 1829 may transmit/receive, for example, communication signals (e.g., RF signals). The RF module 1829 may include, for example, a transceiver, a power amp module (PAM), a frequency filter, a low noise amplifier (LNA), an antenna, or the like. According to another embodiment of the disclosure, at least one of the cellular module 1821, the Wi-Fi module 1823, the BT module 1825, the GNSS module 1827, or the NFC module 1828 may transmit/receive RF signals through a separate RF module.

The SIM 1824 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1830 (e.g., the memory 1730) may include, for example, an internal memory 1832 or an external memory 1834. The internal memory 1832 may include at least one of a volatile memory (e.g., a dynamic random-access memory (DRAM), a static RAM (SRAM), a synchronous dynamic RAM (SDRAM), or the like), a nonvolatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1834 may include a flash drive such as a compact flash (CF), a secure digital (SD), a micro-SD, a mini-SD, an extreme digital (xD), a multimedia card (MMC), a memory stick, or the like. The external memory 1834 may be operatively and/or physically connected to the electronic device 1801 through various interfaces.

The sensor module 1840 may, for example, measure physical quantity or detect an operation state of the electronic device 1801 so as to convert measured or detected information into an electrical signal. The sensor module 1840 may include, for example, at least one of a gesture sensor 1840A, a gyro sensor 1840B, a barometric or atmospheric pressure sensor 1840C, a magnetic sensor 1840D, an acceleration sensor 1840E, a grip sensor 1840F, a proximity sensor 1840G, a color sensor 1840H (e.g., a red/green/blue (RGB) sensor), a biometric sensor 1840I, a temperature/humidity sensor 1840J, an illumination sensor 1840K, or an ultraviolet (UV) sensor 1840M. Additionally or alternatively, the sensor module 1840 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1840 may further include a control circuit for controlling at least one sensor included therein. In some various embodiments of the disclosure, the electronic device 1801 may further include a processor configured to control the sensor module 1840 as a part of the processor 1810 or separately, so that the sensor module 1840 is controlled while the processor 1810 is in a sleep state.

The input device 1850 may include, for example, a touch panel 1852, a (digital) pen sensor 1854, a key 1856, or an ultrasonic input device 1858. The touch panel 1852 may employ at least one of capacitive, resistive, infrared, and ultraviolet sensing methods. The touch panel 1852 may further include a control circuit. The touch panel 1852 may further include a tactile layer so as to provide a haptic feedback to a user.

The (digital) pen sensor 1854 may include, for example, a sheet for recognition which is a part of a touch panel or is separate. The key 1856 may include, for example, a physical button, an optical button, or a keypad. The ultrasonic input device 1858 may sense ultrasonic waves generated by an input tool through a microphone 1888 so as to identify data corresponding to the ultrasonic waves sensed.

The display 1860 (e.g., the display 1760) may include a panel 1862, a hologram device 1864, or a projector 1866. The panel 1862 may have a configuration that is the same as or similar to that of the display 1760 of FIG. 17. The panel 1862 may be, for example, flexible, transparent, or wearable. The panel 1862 and the touch panel 1852 may be integrated into a single module. The hologram device 1864 may display a stereoscopic image in a space using a light interference phenomenon. The projector 1866 may project light onto a screen so as to display an image. The screen may be disposed in the inside or the outside of the electronic device 1801. According to an embodiment of the disclosure, the display 1860 may further include a control circuit for controlling the panel 1862, the hologram device 1864, or the projector 1866.

The interface 1870 may include, for example, an HDMI 1872, a USB 1874, an optical interface 1876, or a D-sub-miniature (D-sub) 1878. The interface 1870, for example, may be included in the communication interface 1770 illustrated in FIG. 17. Additionally or alternatively, the interface 1870 may include, for example, a mobile high-definition link (MHL) interface, an SD card/multi-media card (MMC) interface, or an infrared data association (IrDA) interface.

The audio module 1880 may convert, for example, a sound into an electrical signal or vice versa. At least a portion of elements of the audio module 1880 may be included in the input/output interface 1750 illustrated in FIG. 17. The audio module 1880 may process sound information input or output through a speaker 1882, a receiver 1884, an earphone 1886, or the microphone 1888.

The camera module 1891 is, for example, a device for shooting a still image or a video. According to an embodiment of the disclosure, the camera module 1891 may include at least one image sensor (e.g., a front sensor or a rear sensor), a lens, an image signal processor (ISP), or a flash (e.g., an LED or a xenon lamp).

The power management module 1895 may manage power of the electronic device 1801. According to an embodiment of the disclosure, the power management module 1895 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1896 and a voltage, current or temperature thereof while the battery is charged. The battery 1896 may include, for example, a rechargeable battery and/or a solar battery.

The indicator 1897 may display a specific state of the electronic device 1801 or a part thereof (e.g., the processor 1810), such as a booting state, a message state, a charging state, or the like. The motor 1898 may convert an electrical signal into a mechanical vibration, and may generate a vibration or haptic effect. Although not illustrated, a processing device (e.g., a GPU) for supporting a mobile TV may be included in the electronic device 1801. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 19:
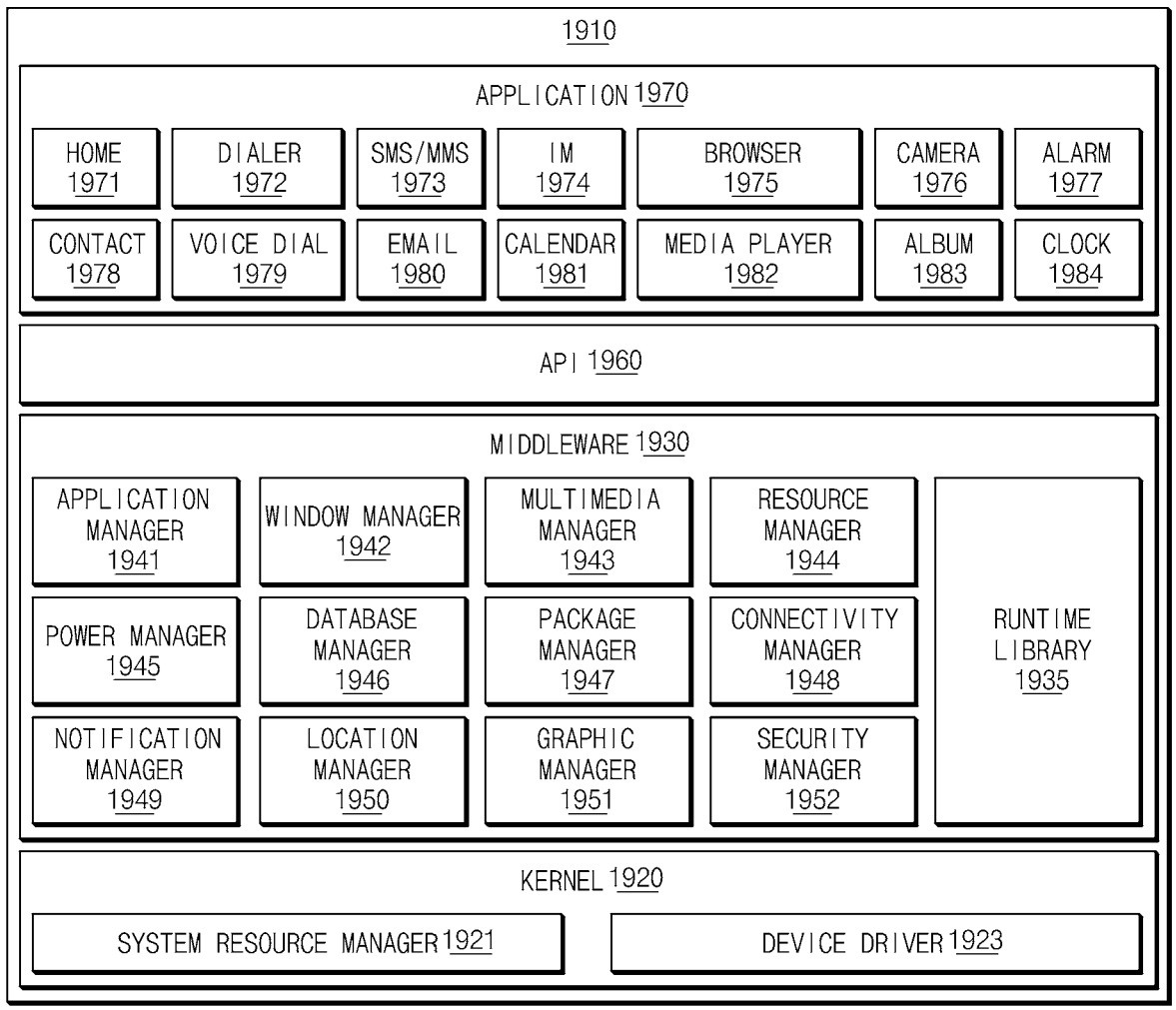
FIG. 19 is a block diagram illustrating a program module according to an embodiment of the disclosure.

FIG. 19 is a block diagram illustrating a program module according to an embodiment of the disclosure.

Referring to FIG. 19, a program module 1910 (e.g., the program 1740) may include an operating system (OS) for controlling a resource related to an electronic device (e.g., the electronic device 1701) and/or various applications (e.g., the application program 1747) running on the OS. The OS may be, for example, Android, iOS, Windows, Symbian, Tizen, or the like.

The program module 1910 may include a kernel 1920, a middleware 1930, an API 1960, and/or an application 1970. At least a part of the program module 1910 may be preloaded on an electronic device or may be downloaded from an external electronic device (e.g., the first electronic device 1702, the second external electronic device 1704, or the server 1706).

The kernel 1920 (e.g., the kernel 1741) may include, for example, a system resource manager 1921 or a device driver 1923. The system resource manager 1921 may perform control, allocation, or retrieval of a system resource. According to an embodiment of the disclosure, the system resource manager 1921 may include a process management unit, a memory management unit, a file system management unit, or the like. The device driver 1923 may include, for example, a display driver, a camera driver, a BT driver, a shared memory driver, a USB driver, a keypad driver, a Wi-Fi driver, an audio driver, or an inter-process communication (IPC) driver.

The middleware 1930, for example, may provide a function that the applications 1970 require in common, or may provide various functions to the applications 1970 through the API 1960 so that the applications 1970 may efficiently use limited system resources in the electronic device. According to an embodiment of the disclosure, the middleware 1930 (e.g., the middleware 1743) may include at least one of a runtime library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, and a security manager 1952.

The runtime library 1935 may include, for example, a library module that a compiler uses to add a new function through a programming language while the application 1970 is running. The runtime library 1935 may perform a function for input/output management, memory management, or an arithmetic function.

The application manager 1941 may mange, for example, a life cycle of at least one of the applications 1970. The window manager 1942 may manage a graphical user interface (GUI) resource used in a screen. The multimedia manager 1943 may recognize a format required for playing various media files and may encode or decode a media file using a codec matched to the format. The resource manager 1944 may manage a resource such as a source code, a memory, or a storage space of at least one of the applications 1970.

The power manager 1945, for example, may operate together with a basic input/output system (BIOS) to manage a battery or power and may provide power information required for operating the electronic device. The database manager 1946 may generate, search, or modify a database to be used in at least one of the applications 1970. The package manager 1947 may manage installation or update of an application distributed in a package file format.

The connectivity manger 1948 may manage wireless connection of Wi-Fi, BT, or the like. The notification manager 1949 may display or notify an event such as message arrival, appointments, and proximity alerts in such a manner as not to disturb a user. The location manager 1950 may manage location information of the electronic device. The graphic manager 1951 may manage a graphic effect to be provided to a user or a user interface related thereto. The security manager 1952 may provide various security functions required for system security or user authentication. According to an embodiment of the disclosure, in the case in which an electronic device (e.g., the electronic device 1701) includes a phone function, the middleware 1930 may further include a telephony manager for managing a voice or video call function of the electronic device.

The middleware 1930 may include a middleware module for forming a combination of various functions of the above-mentioned elements. The middleware 1930 may provide a module specialized for each type of an operating system (OS) to provide differentiated functions. Furthermore, the middleware 1930 may delete a part of existing elements or may add new elements dynamically.

The API 1960 (e.g., the API 1745) which is, for example, a set of API programming functions may be provided in different configurations according to an OS. For example, in the case of Android or iOS, one API set may be provided for each platform, and, in the case of Tizen, at least two API sets may be provided for each platform.

The application 1970 (e.g., the application program 1747), for example, may include at least one application capable of performing functions such as a home 1971, a dialer 1972, a short message service (SMS)/multimedia messaging service (MMS) 1973, an instant message (IM) 1974, a browser 1975, a camera 1976, an alarm 1977, a contact 1978, a voice dial 1979, an e-mail 1980, a calendar 1981, a media player 1982, an album 1983, a clock 1984, health care (e.g., measure an exercise amount or blood sugar), or environmental information provision (e.g., provide air pressure, humidity, or temperature information).

According to an embodiment of the disclosure, the application 1970 may include an information exchange application for supporting information exchange between the electronic device (e.g., the electronic device 1701) and an external electronic device (e.g., the first electronic device 1702 or the second external electronic device 1704). The information exchange application may include, for example, a notification relay application for relaying specific information to the external electronic device or a device management application for managing the external electronic device.

For example, the notification relay application may have a function for relaying, to an external electronic device (e.g., the first electronic device 1702 or the second external electronic device 1704), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 1702 or the second external electronic device 1704) communicating with the electronic device, an application running in the external electronic device, or a service (e.g., a call service, a message service, or the like) provided from the external electronic device.

According to an embodiment of the disclosure, the application 1970 may include a specified application (e.g., a healthcare application of a mobile medical device) according to an attribute of the external electronic device (e.g., the first electronic device 1702 or the second external electronic device 1704). The application 1970 may include an application received from an external electronic device (e.g., the first electronic device 1702 or the second external electronic device 1704). The application 1970 may include a preloaded application or a third-party application downloadable from a server. The names of the elements of the program module 1910 illustrated may vary with the type of an operating system (OS).

According to various embodiments of the disclosure, at least a part of the program module 1910 may be implemented with software, firmware, hardware, or a combination thereof. At least a part of the program module 1910, for example, may be implemented (e.g., executed) by a processor (e.g., the processor 1810). At least a part of the program module 1910 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the disclosure may be implemented as instructions stored in a computer-readable storage medium in the form of a program module. In the case where the instructions are performed by a processor (e.g., the processor 1720), the processor may perform functions corresponding to the instructions. The computer-readable storage medium may be, for example, the memory 1730.

A computer-readable recording medium may include a hard disk, a floppy disk, a magnetic medium (e.g., a magnetic tape), an optical medium (e.g., compact disc (CD)-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the disclosure and vice versa.

A module or a program module according to various embodiments of the disclosure may include at least one of the above-mentioned elements, or some elements may be omitted or other additional elements may be added. Operations performed by the module, the program module or other elements according to various embodiments of the disclosure may be performed in a sequential, parallel, iterative or heuristic way. Furthermore, some operations may be performed in another order or may be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuit;
   a memory configured to store contents including a first image in which a virtual reality is realized; and
   at least one processor electrically connected to the communication circuit and the memory,
   wherein the at least one processor is configured to:
   identify a first external electronic device that is separate from and physically proximate to the electronic device,
   determine whether it is possible for the first external electronic device to photograph a subject by using a camera of the first external electronic device,
   request a preview image from the first external electronic device in response to a determination result that it is possible for the first external electronic device to photograph the subject by using the camera, the preview image being a preparation image for photographing an user of the electronic device,
   receive the preview image the first external electronic device has obtained,
   set a background for a virtual capture image,
   extract an object corresponding to the user of the electronic device from the preview image,
   set the extracted object as an object corresponding to a subject,
   transmit a command from the electronic device to the first external electronic device through the communication circuit in response to a determination result that it is possible for the first external electronic device to photograph the subject by using the camera,
   receive a second image photographed based on the command from the first external electronic device through the communication circuit,
   extract the object corresponding to the subject from the second image, and
   generate the virtual capture image by merging the extracted object to the background.

2. The electronic device of claim 1, wherein the at least one processor is further configured to output at least one of the first image, the second image, or the virtual capture image on a display included in the electronic device or a display device detachably connected the electronic device.

3. The electronic device of claim 1, wherein the second image includes an image obtained by photographing the user of the electronic device.

4. The electronic device of claim 1, wherein the at least one processor is further configured to correct a partial area of the object.

5. The electronic device of claim 1, wherein the at least one processor is further configured to:
- select at least a part of the first image based on at least one of first sensing data obtained through a first sensor included in the electronic device, second sensing data obtained through a second sensor included in the first external electronic device, or a user input, and
- use the selected at least a part of the first image when the virtual capture image is generated.

6. The electronic device of claim 1, wherein the at least one processor is further configured to change a photographing angle of the subject of the second image based on at least one of first sensing data obtained through a first sensor included in the electronic device or second sensing data obtained through a second sensor included in the first external electronic device.

7. The electronic device of claim 1, wherein the at least one processor is further configured to:
- obtain surrounding environment information of at least one of the electronic device or the first external electronic device,
- determine whether an external light source for photographing is necessary, based on the obtained surrounding environment information,
- determine whether there exists a second external electronic device that is able to be utilized as the external light source, and
- control the second external electronic device in response to the determination result that there exists the second external electronic device.

8. The electronic device of claim 1, wherein the at least one processor is further configured to:
- provide an interface such that the first external electronic device or a second external electronic device that is separate from and physically proximate to the electronic device and is able to photograph the subject is selected, in response to the determination result that there exists the second external electronic device, and
- receive the second image from the selected external electronic device in response to selection of the first external electronic device or the second external electronic device.

9. The electronic device of claim 1, wherein the at least one processor is further configured to receive the contents or the first image from a second external electronic device connected to the electronic device through the communication circuit.

10. A photographing method using an external electronic device of an electronic device, the photographing method comprising:
- outputting a first image included in contents that realize a virtual reality on a display;
- identifying a first external electronic device that is separate from and physically proximate to the electronic device;
- determining whether it is possible for the first external electronic device to photograph a subject by using a camera of the first external electronic device;
- requesting a preview image from the first external electronic device in response to a determination result that it is possible for the first external electronic device to photograph the subject by using the camera, the preview image being a preparation image for photographing an user of the electronic device;
- receiving the preview image the first external electronic device has obtained;
- setting a background for a virtual capture image;
- extracting an object corresponding to the user of the electronic device from the preview image;
- setting the extracted object as an object corresponding to a subject;
- transmitting a command from the electronic device to the first external electronic device through a communication circuit in response to a determination result that it is possible for the first external electronic device to photograph the subject by using the camera;
- receiving a second image photographed based on the command from the first external electronic device through the communication circuit;
- extracting the object corresponding to the subject from the second image; and
- generating the virtual capture image by merging the extracted object to the background.

11. The photographing method of claim 10, further comprising:
- outputting the virtual capture image on the display or a display device detachably connected to the electronic device.

12. The photographing method of claim 10, wherein the receiving of the second image includes receiving an image obtained by photographing the user of the electronic device as the second image.

13. The photographing method of claim 10, further comprising:
- correcting a partial area of the object.

14. The photographing method of claim 10, wherein the generating of the third image includes:
- selecting at least a part of the first image based on at least one of first sensing data obtained through a first sensor included in the electronic device, second sensing data obtained through a second sensor included in the first external electronic device, or a user input; and
- using the selected at least a part of the first image when the virtual capture image is generated.

15. The photographing method of claim 10, wherein the receiving of the second image includes changing a photographing angle of the subject of the second image based on at least one of first sensing data obtained through a first sensor included in the electronic device or second sensing data obtained through a second sensor included in the first external electronic device.

16. The photographing method of claim 10, further comprising:
- obtaining surrounding environment information of at least one of the electronic device or the first external electronic device;
- determining whether an external light source for photographing is necessary, based on the obtained surrounding environment information;
- determining whether there exists a second external electronic device that is able to be utilized as the external light source; and
- controlling the second external electronic device in response to the determination result that there exists the second external electronic device.

17. The photographing method of claim 10, further comprising:
- providing an interface such that the first external electronic device or a second external electronic device that is separate from and physically proximate to the electronic device and is able to photograph the subject is selected, in response to the determination result that there exists the second external electronic device; and receiving the second image from the selected external electronic device in response to selection of the first external electronic device or the second external electronic device.

18. The photographing method of claim 10, further comprising:
receiving the contents or the first image from a second external electronic device connected to the electronic device through the communication circuit.

* * * * *